(12) United States Patent
Wang et al.

(10) Patent No.: US 12,253,760 B2
(45) Date of Patent: Mar. 18, 2025

(54) DISPLAY SCREEN AND DISPLAY APPARATUS

(71) Applicants: BEIJING BOE DISPLAY TECHNOLOGY CO., LTD., Beijing (CN); BOE Technology Group Co., Ltd., Beijing (CN)

(72) Inventors: Jing Wang, Beijing (CN); Peng Li, Beijing (CN); Yangyang Cai, Beijing (CN); Chunbing Zhang, Beijing (CN); Xiang Li, Beijing (CN); Bochang Wang, Beijing (CN); Hetao Wang, Beijing (CN); Zhanchang Bu, Beijing (CN); Yu Zhang, Beijing (CN); Shou Li, Beijing (CN)

(73) Assignees: BEIJING BOE DISPLAY TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/788,038

(22) PCT Filed: Jun. 25, 2021

(86) PCT No.: PCT/CN2021/102271
§ 371 (c)(1),
(2) Date: Jun. 22, 2022

(87) PCT Pub. No.: WO2022/266983
PCT Pub. Date: Dec. 29, 2022

(65) Prior Publication Data
US 2024/0168337 A1    May 23, 2024

(51) Int. Cl.
*G02F 1/1335* (2006.01)
*G02F 1/137* (2006.01)
(Continued)

(52) U.S. Cl.
CPC .. *G02F 1/133626* (2021.01); *G02F 1/133504* (2013.01); *G02F 1/133531* (2021.01);
(Continued)

(58) Field of Classification Search
None
See application file for complete search history.

(56) References Cited

U.S. PATENT DOCUMENTS 3,610,729 A      10/1971  Rogers
6,583,833 B1 *    6/2003  Kashima ........... G02F 1/133555
                                                          349/98
(Continued)

FOREIGN PATENT DOCUMENTS

CN       1760740 A     4/2006
CN     101055359 B     5/2010
(Continued)

OTHER PUBLICATIONS

First Office Action in the Chinese Patent Application No. 202180001609.9, dated Jul. 18, 2024; English translation attached.

*Primary Examiner* — Fred Tzeng
(74) *Attorney, Agent, or Firm* — Intellectual Valley Law, P.C.

(57) ABSTRACT

Disclosed are a display screen and a display apparatus, comprising: a transmissive liquid crystal panel comprising a displaying side and a non-displaying side arranged opposite to each other; a first polarizer arranged at the displaying side of the transmissive liquid crystal panel; a second polarizer arranged at the non-displaying side of the transmissive liquid crystal panel, a direction of a transmission axis of the first polarizer is perpendicular to that of the second polarizer; a scattering layer arranged between the transmissive liquid crystal panel and at least one of the first polarizer the second polarizer; a reflective polarizer arranged between the transmissive liquid crystal panel and the second polarizer.

(Continued)

The disclosed display screen and the display apparatus have a relatively high transmittance and reflectivity, and can be used under different outdoor illuminations so as to realize environmentally friendly effects such as energy saving and emission reduction.

16 Claims, 9 Drawing Sheets

(51) Int. Cl.
  *G09G 3/20* (2006.01)
  *G09G 3/34* (2006.01)
  *G09G 3/36* (2006.01)
(52) U.S. Cl.
  CPC .......... *G02F 1/137* (2013.01); *G09G 3/2007* (2013.01); *G09G 3/2096* (2013.01); *G09G 3/3406* (2013.01); *G09G 3/36* (2013.01); *G02F 2202/28* (2013.01); *G09G 2310/0243* (2013.01); *G09G 2310/0297* (2013.01); *G09G 2320/02* (2013.01); *G09G 2320/0626* (2013.01); *G09G 2330/021* (2013.01); *G09G 2340/00* (2013.01); *G09G 2360/144* (2013.01); *G09G 2360/16* (2013.01)

(56) References Cited

U.S. PATENT DOCUMENTS

| | | | | |
|---|---|---|---|---|
| 7,522,240 | B1* | 4/2009 | Jang | G02F 1/13363 |
| | | | | 349/114 |
| 7,643,107 | B2* | 1/2010 | Akiyama | G09G 3/3611 |
| | | | | 349/83 |
| 7,903,216 | B2* | 3/2011 | Tsuchiya | G02F 1/1393 |
| | | | | 349/114 |
| 9,383,589 | B2* | 7/2016 | Cho | G02B 30/27 |
| 11,237,433 | B2* | 2/2022 | Ma | G02B 6/102 |
| 2006/0007370 | A1* | 1/2006 | Suzuki | G02F 1/13362 |
| | | | | 349/74 |
| 2007/0242014 | A1 | 10/2007 | Lee et al. | |
| 2008/0252832 | A1* | 10/2008 | Nieuwkerk | G02F 1/133504 |
| | | | | 349/112 |
| 2009/0279022 | A1* | 11/2009 | Wu | G02F 1/133555 |
| | | | | 349/75 |
| 2010/0225640 | A1* | 9/2010 | Vieri | G06F 1/3218 |
| | | | | 345/87 |
| 2011/0164207 | A1* | 7/2011 | Arai | G02F 1/1347 |
| | | | | 349/96 |
| 2014/0132898 | A1* | 5/2014 | Qin | G02F 1/133555 |
| | | | | 349/103 |
| 2014/0240342 | A1 | 8/2014 | Xu et al. | |
| 2014/0340753 | A1 | 11/2014 | Kusama et al. | |
| 2015/0177563 | A1* | 6/2015 | Cho | G02F 1/1347 |
| | | | | 349/96 |
| 2015/0323834 | A1* | 11/2015 | Choi | G02F 1/133528 |
| | | | | 359/885 |
| 2016/0025907 | A1 | 1/2016 | Kusama et al. | |
| 2016/0195659 | A1 | 7/2016 | Johnson et al. | |
| 2017/0010505 | A1 | 1/2017 | Shi et al. | |
| 2017/0047019 | A1 | 2/2017 | Li et al. | |
| 2017/0261679 | A1* | 9/2017 | He | G02B 6/0053 |
| 2018/0284539 | A1* | 10/2018 | Zha | G02F 1/133555 |
| 2019/0049801 | A1 | 2/2019 | Liu et al. | |
| 2020/0271995 | A1* | 8/2020 | Weindorf | G02F 1/13471 |
| 2022/0121062 | A1* | 4/2022 | Zhang | G06F 3/0412 |
| 2023/0070646 | A1* | 3/2023 | Wang | G02F 1/133618 |

FOREIGN PATENT DOCUMENTS

| | | |
|---|---|---|
| CN | 102414601 A | 4/2012 |
| CN | 103278975 A | 9/2013 |
| CN | 104965371 A | 10/2015 |
| CN | 105208191 A | 12/2015 |
| CN | 105974697 A | 9/2016 |
| CN | 106328088 A | 1/2017 |
| CN | 107300803 A | 10/2017 |
| CN | 207650518 U | 7/2018 |
| CN | 212623464 U | 2/2021 |
| CN | 114326197 A | 4/2022 |
| JP | H10206844 A | 8/1998 |
| JP | 2000031680 A | 1/2000 |
| JP | 2000131680 A | 5/2000 |
| JP | 2006220879 A | 8/2006 |
| JP | 2007187753 A | 7/2007 |
| JP | 2007298634 A | 11/2007 |
| JP | 2009276401 A | 11/2009 |
| JP | WO2013108540 A1 | 5/2015 |
| JP | 5855791 B2 | 2/2016 |
| TW | 201518792 A | 5/2015 |

\* cited by examiner

Black state

White state

Black state

White state

DISPLAY SCREEN AND DISPLAY APPARATUS

CROSS-REFERENCE TO RELATED APPLICATION

This application is a national stage application under 35 U.S.C. § 371 of International Application No. PCT/CN2021/102271, filed Jun. 25, 2021, the contents of which are incorporated by reference in the entirety.

TECHNICAL FIELD

The present disclosure relates to the technical field of display, and in particular, to a display screen and a display apparatus.

BACKGROUND

With the developing of science and technology, intelligent Internet of Things has gradually adopted in various fields such as transportation, health care, education, environmentally friendly, public safety, and intelligent home and so on. Human-computer interaction is the basis for the intelligent Internet of Things, and display screen appears in all corners of the city as an important medium for human-computer interaction.

For an outdoor display exposed to natural conditions, the temperature of such product can be significantly reduced if the ambient light having a high brightness serves as a light source for the display screen while the backlight is turned off, which is not only energy-saving and environmentally friendly, but also can elongate the service life of the outdoor display. Thus, the semi-reflecting and semi-transmitting liquid crystal display in the related art is applied in the scenario of outdoor displaying.

However, the semi-reflecting and semi-transmitting liquid crystal display in the related art has a complicated manufacturing process, a high developing cost, a long developing cycle, a significantly reduced transmittance or reflectivity of the display panel, and a low brightness.

SUMMARY

Embodiments of the present disclosure provide a display screen and a display apparatus, which can improve the display brightness, and the process for manufacturing the same is simple.

The technical solution provided by embodiments of the present disclosure is as follows. Embodiments of the present disclosure provide a display screen, comprising:
- a transmissive liquid crystal panel, the transmissive liquid crystal panel comprising a displaying side and a non-displaying side arranged opposite to each other;
- a first polarizer, arranged at a displaying side of the transmissive liquid crystal panel;
- a second polarizer, arranged at the non-displaying side of the transmissive liquid crystal panel, a direction of a transmission axis of the first polarizer being perpendicular to a direction of a transmission axis of the second polarizer;
- a scattering layer, arranged between the first polarizer and the transmissive liquid crystal panel, and/or arranged between the second polarizer and the transmissive liquid crystal panel; and a reflective polarizer, the reflective polarizer being arranged between the transmissive liquid crystal panel and the second polarizer.

Illustratively, the scattering layer includes a scattering film.

Illustratively, the scattering layer includes a high-haze optical adhesive coating.

Illustratively, the reflective polarizer is located between the scattering film and the second polarizer in a case that the scattering film is arranged between the second polarizer and the transmissive liquid crystal panel.

Illustratively, a direction of a diffusion axis of the scattering film, a direction of a transmission axis of the reflective polarizer and the direction of the transmission axis of the second polarizer are identical.

Illustratively, the scattering film, the reflective polarizer and the second polarizer form an external composite film material, which is arranged on the transmissive liquid crystal panel in a full lamination manner.

Illustratively, the first polarizer is arranged on the transmissive liquid crystal panel in a full lamination manner.

Illustratively, the display screen further comprises an antireflection thin film arranged on a side of the first polarizer away from the transmissive liquid crystal panel.

Illustratively, the liquid crystal panel is at least one of a twisted nematic liquid crystal panel, a vertically oriented liquid crystal panel, an in-plane switching liquid crystal panel, a fringe field switching liquid crystal panel, or a dye liquid crystal panel.

Illustratively, the reflective polarizer comprises a core layer formed by a plurality of birefringent material layers and a plurality of layers of non-birefringent materials that are alternately stacked, where a refractive index for the plurality of birefringent material layers is greater than a refractive index for the plurality of non-birefringent material layers.

Embodiments of the present disclosure also provide a display apparatus, comprising:
- the display screen provided by the embodiments of the present disclosure;
- a backlight module, configured for providing light source to the display screen;
- a video signal processing unit, configured for controlling a video display signal of the display screen;
- a light detection unit, configured for obtaining ambient light data;
- a microcontroller unit connected to the light detection unit and the video signal processing unit, the microcontroller unit being configured for generating a mode switching signal according to the ambient light data collected by the light detection unit, and for controlling an operating state of the backlight module and an operating state of the video display unit, to cause the display apparatus to be switched between a transmissive mode and a reflective mode,
wherein in the transmissive mode, the backlight module is turned on, and the video signal processing unit sends a first image display signal to the display screen; and
in the reflective mode, the backlight module is turned off, and the video signal processing unit sends a second image display signal to the display screen, an image grey scale of the first image display signal and an image grey scale of the second image display signal are complementary.

Illustratively, the light detection unit comprises a light collector, the light collector is arranged around the display screen for collecting the ambient light data; and
the microcontroller unit comprises:
- a data analyzer connected to the light collector, the data analyzer is configured for processing and analyzing the light signal collected by the light collector to obtain an ambient light parameter L; and a signal generator, configured for sending, in a case that the ambient light parameter L is greater than a first critical value, a first signal to the backlight module and to the video signal processing unit to cause the display apparatus to be switched to the reflective mode, and for sending, in a case that the ambient light parameter L is less than the first critical value or a signal indicating a damage to the light collector is received, a second signal to the backlight module and to the video signal processing unit, to cause the display apparatus to be switched to the transmissive mode.

Illustratively, the light collector comprises m host sensors and n secondary sensors, where m and n are both positive integers greater than or equal to 2, the m host sensors are arranged at a top position of the display screen at a use state, and the n secondary sensors are arranged at a bottom position of the display screen at the use state; and the data analyzer specifically comprises:

a first determiner, configured for determining the quantity m' for host sensors among the m host sensors that collect light data, wherein m' is 0 or a positive integer less than or equal to m;

a first comparator connected to the first determiner, configured for comparing, in a case that m' is a positive integer less than or equal to m, a difference value for the light data collected by the m' host sensors with a first predefined threshold to determine whether said difference value is within first predefined threshold;

a first data calculator connected to the first comparator, configured for calculating, in a case that the difference value for the light data collected by the m' host sensors is within first predefined threshold, an average value for the light data of the m' host sensors, to obtain first data $L_{M1}$, $L_{M1}=(M_1+M_2 \ldots M_{m'})/m'$, wherein $M_{m'}$ is light data of an (m')-th the host sensor;

a second determiner, configured for determining the quantity n' for secondary sensors among the n secondary sensors that collect light data, wherein n' is 0 or a positive integer less than or equal to n;

a second comparator, the second comparator is connected to the second determiner, and the second comparator is configured for determining, in a case that n' is a positive integer less than or equal to n, whether a difference value for the light data collected by the n' secondary sensors is within a second predefined threshold by comparison;

a second data calculator, configured for calculating, in a case that a different value for light data collected by x secondary sensors among the n' secondary sensors is within the second predefined threshold, and a different value for light data collected by remaining (n−x) secondary sensors exceeds the second predefined threshold, an average value for the light data of the x secondary sensor, to obtain second data $L_{S1}$, $L_{S1}=(S_1+S_2 \ldots S_x)/x$, wherein $S_x$ is light data of an x-th the secondary sensor, and x is a positive integer less than or equal to n;

a third data calculator connected to the first data calculator and the second data calculator, configured for obtaining, according to the first data $L_{M1}$ and the second data $L_{S1}$, the ambient light parameter L by $L=L_{M1}+|L_{s1}-L_{M1}|/(m'+x)$;

a third comparator connected to the first comparator and the second data calculator, configured for determining, in a case that the difference value for the light data collected by the m' host sensors exceeds the first predefined threshold, and the difference value for the light data collected by the n' secondary sensors is within the second predefined threshold, whether a difference value between the light data collected by each host sensor among the m' host sensors and the second data $L_{S1}$ is within a third predefined threshold by comparison;

a fourth data calculator connected to the third comparator, configured for calculating, in a case that a difference value between light data collected by y host sensors among the m' host sensors and the second data $L_{S1}$ is within the third predefined threshold, and a difference value for light data collected by remaining (m'−y) host sensors exceeds the third predefined threshold, an average value for the light data of the y host sensors to obtain fourth data $L_{M2}$, $L_{M2}=(M_1+M_2 \ldots M_y)/y$, wherein $M_y$ is light data of an y-th the host sensor, and y is a positive integer less than or equal to m';

a fifth data calculator connected to the fourth data calculator and the second data calculator, configured for obtaining, according to the fourth data $L_{M2}$ and the second data $L_{S1}$, the ambient light parameter L by $L=L_{M2}+|L_{S1}-L_{M2}|/(y+x)$;

a fourth comparator connected to the first comparator and the second comparator, configured for determining, in a case that the difference value for the light data collected by the n' secondary sensors exceeds the second predefined threshold and the difference value for the light data collected by the m' host sensors exceeds the first predefined threshold, whether a difference value between the light data collected by each of the m' host sensors and pre-stored light data, and a difference value between the light data collected by each of the n' secondary sensors and the pre-stored light data are within the fourth predefined threshold by comparison;

a sixth data calculator connected to the fourth comparator, configured for obtaining, according to light data of y' host sensors among the m' host sensors and light data of x' secondary sensors among the n' secondary sensors, $L=LM3+|L_{s3}-L_{M3}|/(y'+x')$, a difference value between the light data of each of the y' host sensors and the pre-stored light data is within the fourth predefined threshold, a difference value between the light data of each of the x' secondary sensors and the pre-stored light data is within the fourth predefined threshold, wherein $L_{M3}=(M_1+M_2 \ldots M_{y'})/y'$, $M_{y'}$ is light data of a y'-th host sensor; $L_{s3}=(S_1+S_2 \ldots S_{x'})/x'$, wherein $S_{x'}$ is light data of an x'-th secondary sensor, and y' and x' are both positive integers less than or equal to n;

a seventh data calculator connected to the first determiner, the second determiner and the second data calculator, the seventh data calculator is configured for calculating, in a case that the m' is 0 and n' is a positive integer less than or equal to n, the ambient light parameter L by $L=L_{S1}$;

a third determiner connected to the first determiner and second determiner, configured for determining, in a case that the m' is 0 and n' is 0, that the damage to the light collector is present, and sending the signal indicating the damage to the light collector to the signal generator; and a fourth determiner connected to the fourth comparator, configured for determining, in a case that the difference value for the light date collected by the n' secondary sensors exceeds the second predefined threshold, and the difference value for the light data collected by the m' host sensors exceeds the first predefined threshold, and the difference value between the light data collected by each of the m' host sensors and the pre-stored light data, the difference value between the light data collected by each of the n' secondary sensors and the pre-stored light data exceeds the fourth predefined threshold, that the damage to the light collector is present, and sending the signal indicating the damage to the light collector to the signal generator.

Illustratively, the video signal processing unit is specifically configured for:

outputting a video signal directly in a point-to-point mode to enable the display screen to perform a normal grayscale display, in case of receiving the first signal for switching the display apparatus to the transmissive mode; and performing an inverse color processing on the video signal and outputting the processed video signal to enable the display screen to perform a normal grayscale display, in case of receiving the second signal for switching the display apparatus to the reflective mode.

Illustratively, the video signal processing unit specifically comprises:

a display drive unit connected to the display screen;

a T-con circuit connected to the microcontroller unit, configured for receiving the mode switching signal of the microcontroller unit;

a first gamma chip and a second gamma chip integrated on the T-con circuit, wherein the first gamma chip is configured for generating grayscale information in the transmissive mode, and the second gamma chip is configured for generating grayscale information in the reflective mode; and a multiplexer switch circuit connected between the T-con circuit and the display drive unit, configured for outputting corresponding grayscale information to the display drive unit according to the received mode switching signal.

Illustratively, the microcontroller unit further comprises:

a first timer, configured for starting a timing when the ambient light parameter L collected by the light detection unit is greater than or equal to the first critical value; and a first judger, configured for determining whether the ambient light parameter L remains to be greater than or equal to the first critical value within a predetermined time period lased from a start of the timing, determining that the display apparatus needs to be switched to the reflective mode in case of a positive determination; and determining that the display apparatus does not need to be switched to reflective mode in case of a negative determination.

Illustratively, the microcontroller unit further comprises:

a first signal generator, configured for generating, in a case that the ambient light parameter L is greater than the first critical value and is in a descending state, the mode switching signal when the ambient light parameter L is descended to the first critical value, controlling the display apparatus to be switched to the transmissive mode, and obtaining a backlight brightness value Lbl of the backlight module according to a liquid crystal panel surface brightness Lts=Lbl*β, wherein β is a transmittance of the liquid crystal panel, and controlling the operating state of the backlight module according to the backlight brightness value Lbl;

a second signal generator, configured for controlling the backlight brightness value Lbl of the backlight module to remain unchanged in a case that the ambient light parameter L is less than the first critical value, and is in a descending state and greater than a second critical value;

a third signal generator, configured for starting a timing in a case that the ambient light parameter L reaches the second critical value, and determining whether the ambient light parameter L remains to be less than the second critical value within a predetermined time period lasted from a start of the timing, and controlling the backlight brightness of the backlight module to decrease to Lbl/z in case of a positive determination, where z is a positive integer greater than 1;

a fourth signal generator, configure for starting a timing in a case that the ambient light parameter L increases from a value below the second critical value to a value above the second critical value, and determining whether the ambient light parameter L always remains to be greater than the second critical value within a predetermined duration period lasted from a start of the timing, and controlling the backlight brightness of the backlight module to increase to the value Lbl in case of a positive determination; and a fifth signal generator, configured for generating the mode switching signal when the ambient light parameter L increases to the first critical value, controlling the display apparatus to be switched to the transmissive mode and controlling the backlight module to be turned off.

The advantages for embodiments of the present disclosure are as follows.

With the display screen and the display apparatus provided by the embodiment of the present disclosure, issues such as a complex manufacturing process, a high developing cost and a long developing cycle in the semi-reflecting and semi-transmitting display apparatus in the related art can be addressed. The display screen provided by the embodiments of the present disclosure can be used as a display screen of transmissive type and a display screen of reflective type, which has a relatively high transmittance and reflectivity, and can be used in a different outdoor illuminations, so as to achieve environmentally friendly effects such as energy saving and emission reduction. In addition, the process for manufacturing the same is simple and the resultant product has a high stability. Through a matching circuit design, an automatically switching between the transmissive and reflective display modes can be implemented according to the ambient light. The solution has a strong applicability, and can be applied to liquid crystal display products in various sizes.

DETAILED DESCRIPTION

Figure 1:
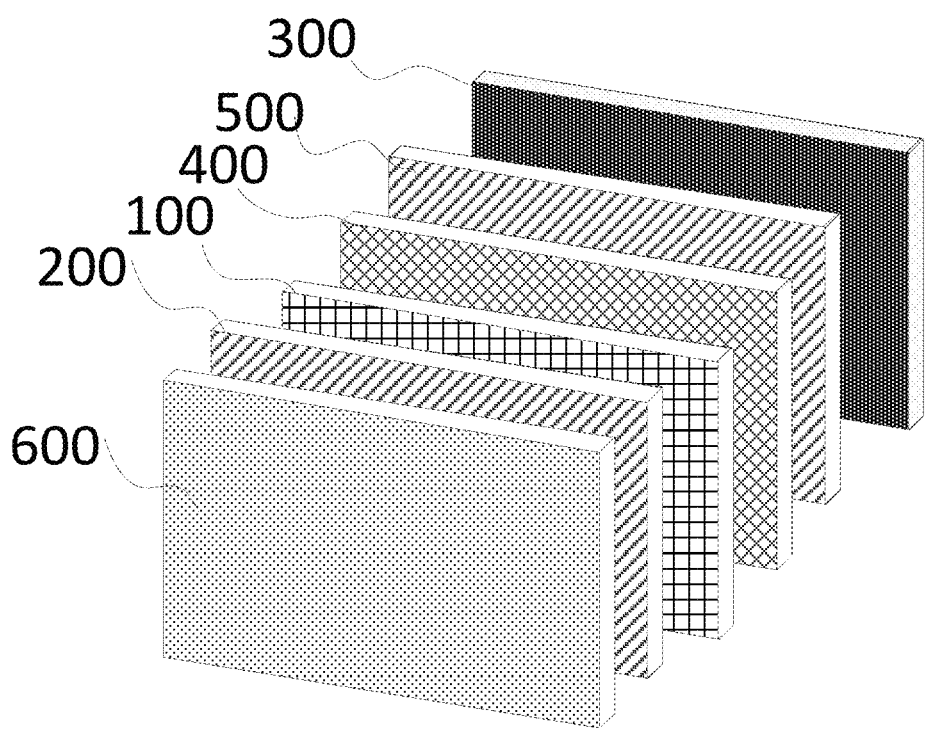
FIG. 1 is a three-dimensional schematic view of a display screen provided by some embodiments of the present disclosure.

To illustrate the object, technical solution and advantage of embodiments of the present disclosure more clearly, a clear and complete description of the technical solution for the embodiments of the present disclosure will be provided hereinafter in conjunction with the accompanying drawings for the embodiments of the present disclosure. Apparently, the described embodiments are some embodiments, rather than all embodiments, of the present disclosure. Based on the described embodiment of the present disclosure, all other embodiments obtained by a person of ordinary skill in the art without any creative effort fall within the scope of the present disclosure.

Unless defined otherwise, technical or scientific terms used in this disclosure shall have the ordinary meaning as understood by one of ordinary skill in the art to which this disclosure belongs. The use of "first", "second", and the like in this disclosure does not denote any order, quantity, or importance, but rather is used to distinguish one element from another. Likewise, terms such as "a", "an", or "the" do not denote a limitation of quantity, but rather denote the presence of at least one of the referenced item. The word "include" or "comprise", and the like, means that the presence of an element or item preceding the word encompass the presence of the element or item listed after the word and equivalents thereof, but does not exclude other elements or items. The terms "connect", "couple", or "link" and the like, are not limited to a physical or mechanical connection, but may include an electrical connection, whether direct or indirect. The terms "upper", "lower", "left", "right" and the like are used only to indicate a relative position relationship, which may change accordingly when the absolute position of the object being described changes.

Before describing the display screen and the display apparatus provided by the embodiment of the present disclosure in details, a brief introduction of the related art is given as follows.

In the related art, the semi-reflecting and semi-transmitting liquid crystal display is used in scenes of outdoor displaying. For all semi-reflecting and semi-transmitting liquid crystal display products in the related art, a transmissive region and a reflective region are simultaneously manufactured on a thin-film transistor array substrate, so that 1/n area of a sub-pixel has a transmission function and the other (n−1)/n area has a reflection function. In order to achieve the semi-reflecting and semi-transmitting function, there is a need for an accurate design of the sub-pixel structure, and the reflecting layer material and the transmissive layer material are separately deposited on the thin-film transistor array substrate. Also, due to the different optical paths when displaying in a reflective mode and a transmissive mode, a set of in-pixel dual-switching devices needs to designed for driving the liquid crystal display apparatus. The display apparatus is formed by dual TFT elements and has functions of storing image data and displaying an image.

However, there is a need for horizontal and vertical compatibility and variable size as the outdoor display has complex usage scenarios. The design in which both the reflective layer and the transmissive layer are located in a liquid crystal cell needs to develop new mask (Mask) of different sizes according to size requirements for different products. The cost of a Mask of a large size is up to 1 million China Yuans (RMB) while the accuracy requirement is high, which will inevitably increase the developing cost and developing cycle of the product. Moreover, with the increasing popularity of full-high definition panel, the size of the sub-pixel becomes smaller and smaller, which increases the difficulty in semi-reflecting and semi-transmitting fabrication. Meanwhile, in the semi-reflecting and semi-transmitting display in the related art, the sub-pixel is divided into two parts including a transmissive region and a reflective region, or a BM area and the like are used for fabricating a reflecting layer, the transmittance or reflectivity of the display panel is significantly reduced, resulting in a reduced display brightness.

For address the above issues, embodiments of the present disclosure provides a display screen and a display apparatus, which can address issues such as a complex manufacturing process, a high developing cost and long developing cycle for the semi-reflecting and semi-transmitting display in the related art. The display screen and the display apparatus provided by the embodiments of the present disclosure have a high transmittance and reflectivity, which can be used in different outdoor ambient lights and realize environmentally friendly effects such as energy saving and emission reduction.

Figure 2:
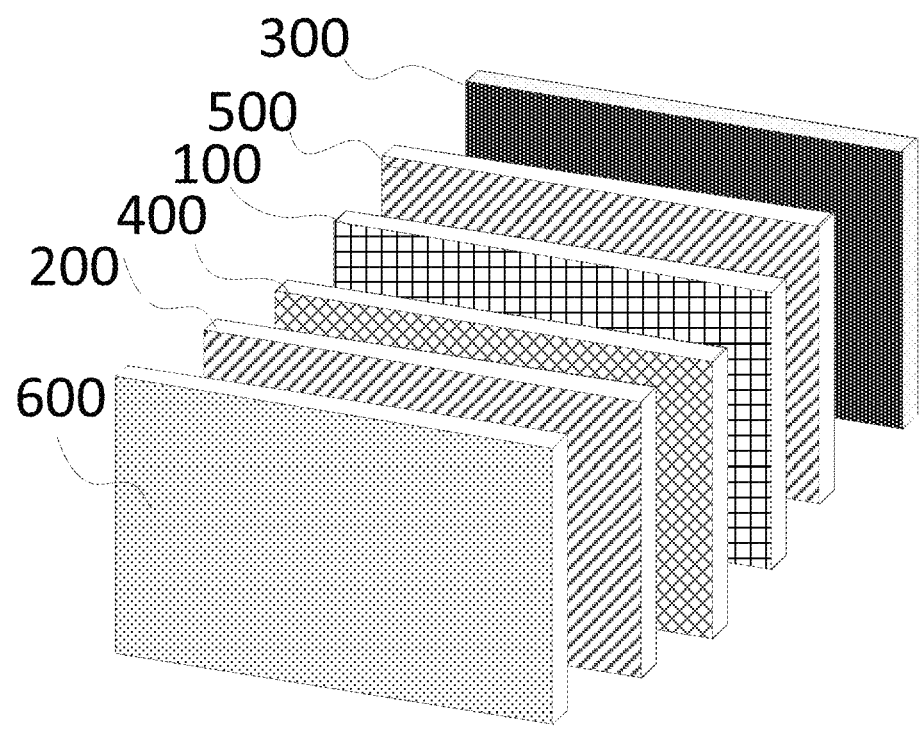
FIG. 2 is a three-dimensional schematic view of a display screen provided by some other embodiments of the present disclosure.
Figure 8:
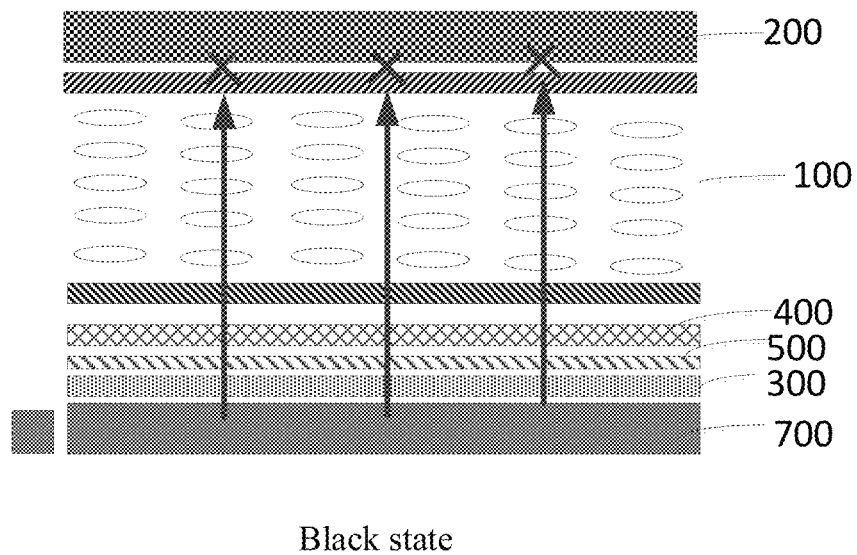
FIG. 8 is a schematic view of an optical path of a display screen when being in a black state under a transmissive mode provided by some embodiments of the present disclosure.
Figure 9:
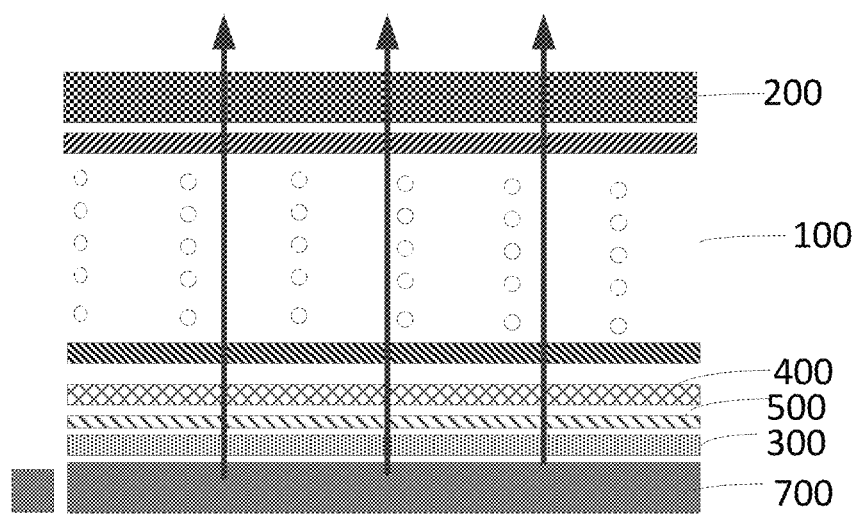
FIG. 9 is a schematic view of an optical path of a display screen when being in a white state under a transmissive mode provided by some embodiments of the present disclosure.
Figure 10:
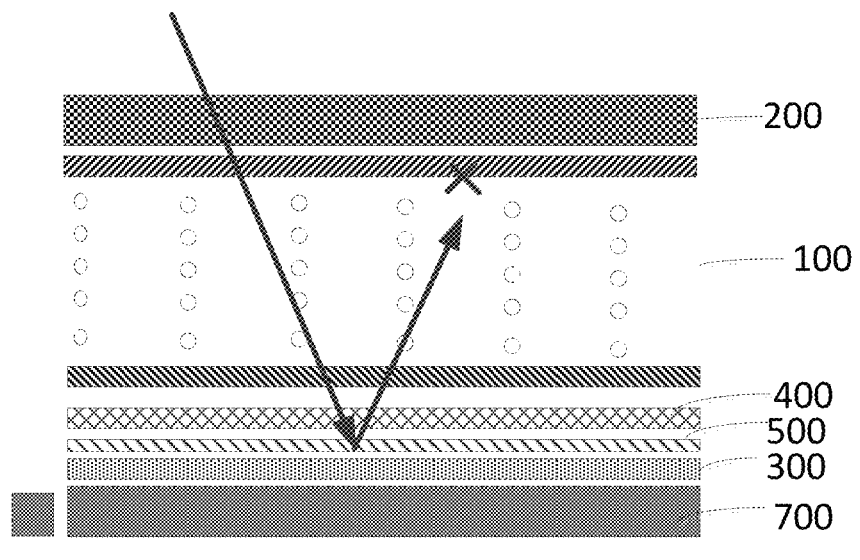
FIG. 10 is a schematic view of an optical path of a display screen when being in a black state under a reflective mode provided by some embodiments of the present disclosure.
Figure 11:
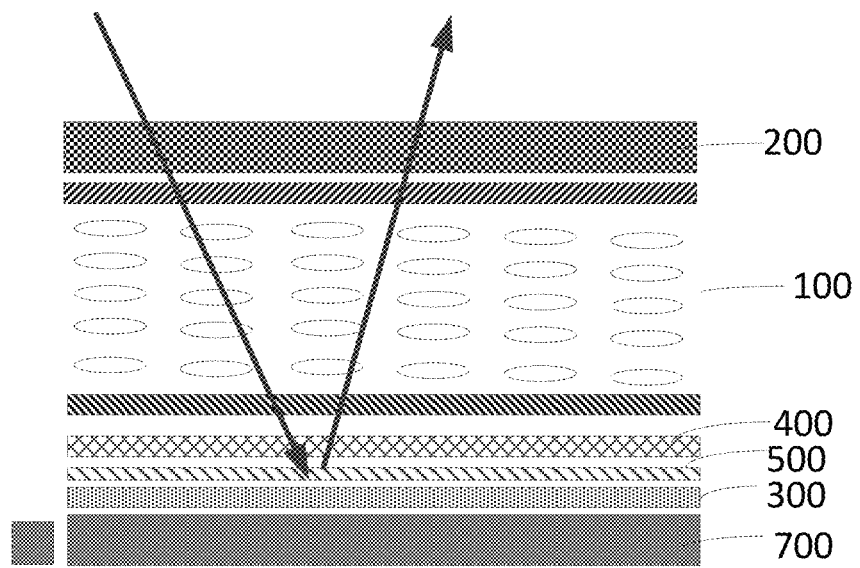
FIG. 11 is a schematic view of an optical path of a display screen when being in a black state under a reflective mode provided by some embodiments of the present disclosure.

FIG. 1 and FIG. 2 are three-dimensional schematic views of a display screen provided by some embodiments of the present disclosure; FIG. 8 is a schematic view of an optical path of a display screen when being in black state under a transmissive mode provided by some embodiments of the present disclosure; FIG. 9 is a schematic view of an optical path of a display screen when being in a white state under the transmissive mode provided by some embodiments of the present disclosure; FIG. 10 is a schematic view of an optical path of a display screen when being in a black state under a reflective mode provided by some embodiments of the present disclosure; and FIG. 11 is a schematic view of an optical path of a display screen when being in a black state under the reflective mode provided by some embodiments of the present disclosure.

As shown in FIGS. 1 and 2, the display screen provided by embodiments of the present disclosure comprises:

a transmissive liquid crystal panel 100, the transmissive liquid crystal panel 100 comprises a displaying side and a non-displaying side arranged opposite to each other;

a first polarizer 200, arranged at the displaying side of the transmissive liquid crystal panel 100;

a second polarizer 300, arranged at the non-displaying side of the transmissive liquid crystal panel 100, a direction of a transmission axis of the first polarizer 200 is perpendicular to a direction of a transmission axis of the second polarizer 300;

a scattering layer 400, arranged between the first polarizer 200 and the transmissive liquid crystal panel 100, and/or, arranged between the second polarizer 300 and the transmissive liquid crystal panel 100; and a reflective polarizer 500, the reflective polarizer 500 is arranged between the transmissive liquid crystal panel and the second polarizer 300.

The display screen provided by embodiments of the present disclosure provides an improvement on basis of the transmissive liquid crystal panel 100. The transmissive liquid crystal panel 100 may be any of various types of display screens such as a twisted nematic liquid crystal panel, a vertically oriented liquid crystal panel, an in-plane switching liquid crystal panel, a fringe field switching liquid crystal panel, a dye liquid crystal panel and the like. Hereinafter, embodiments of the present disclosure are exemplified by the in-plane switching liquid crystal (ADS) display screen.

In the display screen provided by embodiments of the present disclosure, the transmissive liquid crystal panel 100 is selected, and the reflective polarizer 500 is arranged at the non-displaying side of the transmissive liquid crystal panel 100. In this manner, when the backlight of backlight module 700 is turned on, a displaying in a transmissive mode may be implemented, and when the backlight of backlight module 700 is turned off, external ambient light is reflected by the reflective polarizer 500, and thus a displaying in a reflective mode may be implemented. That is to say, the display screen provided by embodiments of the present disclosure is a display screen that has two functions including transmission and reflection. Compared with the semi-reflecting and semi-transmitting liquid crystal display in the related art, since there is no need to divide a sub-pixel into a transmissive region and a reflective region, both the transmittance of the display panel in the transmissive mode and the reflectivity of the display panel in the reflective mode can be improved, and the brightness can be improved. In addition, for the high resolution display product, the manufacturing difficulty is reduced when compared with the semi-reflecting and semi-transmitting liquid crystal display in the related art, and the issues in the semi-reflecting and semi-transmitting display in the related art, such as a complex manufacturing process, a high developing cost and a long developing cycle, are addressed.

Specifically, the optical path of the display screen under the transmissive mode and the reflective mode provided by embodiments of the present disclosure is described in detail. FIG. 8 is a schematic view of the optical path of the display screen when being in the black state under the transmissive mode provided by some embodiments of the present disclosure; FIG. 9 is a schematic view of the optical path of the display screen when being in the white state under the transmissive mode provided by some embodiments of the present disclosure; FIG. 10 is a schematic view of the optical path of the display screen when being in the black state under the reflective mode provided by some embodiments of the present disclosure; and FIG. 11 is a schematic view of the optical path of the display screen when being in the black state under the reflective mode provided by some embodiments of the present disclosure. As shown in FIGS. 8 and 9, under the transmissive mode, the backlight of the backlight module 700 is turned on, a state in which the liquid crystal in the display panel operates is the white state, and a state in which the liquid crystal does not operate is the black state. As shown in FIGS. 10 and 11, under the reflective mode, the backlight of the backlight module 700 is turned off, a state in which the liquid crystal does not operate is the white state, and a state in which the liquid crystal operates is the black state.

In the embodiments provided by the present disclosure, as shown in FIGS. 1 and 2, the display screen may further include an antireflection thin film 600 arranged at a side of the first polarizer 200 away from the transmissive liquid crystal panel 100.

In some embodiments provided by the present disclosure, the scattering layer 400 may be selected as a scattering film capable of being arranged external to the transmissive liquid crystal panel 100, wherein the scattering film is capable of scattering light while maintaining the original polarization state of the light. The specific material selected for the scattering film is not limited, any optical film material may be applied herein as long as the original polarization state of the light can be maintained and the light can be scattered.

As shown in FIG. 1, in some specific embodiments, the scattering film may be arranged between the second polarizer 300 and the transmissive liquid crystal panel 100, and the reflective polarizer 500 is arranged between the scattering film and the second polarizer 300. As shown in FIG. 2, in some other embodiments, the scattering film may also be arranged between the first polarizer 200 and the transmissive liquid crystal panel 100.

It is noted that, in the above-mentioned two types of embodiments, compared with the case where the scattering film is arranged between the first polarizer 200 and the transmissive liquid crystal panel 100, the display screen has a better performance when being in the black state in the case where the scattering film is arranged between the second polarizer 300 and the transmissive liquid crystal panel 100.

Furthermore, the scattering layer 400 may not be limited to an external arranged scattering film, for example, in some embodiments, the scattering layer 400 may also be a high-haze optical adhesive coating (optical clear adhesive, OCA), and FIGS. 1 and 2 show schematic views in which the display screen adopts a high-haze optical adhesive coating according to two types of embodiments. As shown in FIG. 1, the high-haze optical adhesive coating may be arranged between the first polarizer 200 and the transmissive liquid crystal panel 100. Alternatively, as shown in FIG. 2, the high-haze optical adhesive coating may be arranged between the transmissive liquid crystal panel 100 and the reflective polarizer 500.

It should be noted here that the high haze of the high-haze optical adhesive coating here means that it can scatter light, and the specific haze value thereof is not limited. A suitable haze value may be selected according to the actual requirements of the display screen product in practical applications.

Furthermore, it should be noted that, in some other embodiments, the scattering layer 400 may also include both the scattering film and the high-haze optical adhesive coating. In some other embodiments, the scattering layer 400 may also be arranged on both the displaying side of the transmissive liquid crystal panel 100 and the non-displaying side of the transmissive liquid crystal panel 100.

A more detailed description for the display screen according to embodiments of the present disclosure is given hereinafter by taking an example in which the scattering layer 400 is selected to be the scattering film.

In some embodiments, the first polarizer 200 is arranged on the transmissive liquid crystal panel 100 in a full lamination manner, wherein the transmission axis of the first polarizer 200 is in parallel with (E-mode) or perpendicular to (O-mode) an orientation of the liquid crystal of the upper substrate (e. g. color film substrate) of the transmissive liquid crystal panel 100.

It should be noted here that the O-mode refers to that the absorption axis of the second polarizer 300 located at the non-displaying side of liquid crystal panel is in parallel with the orientation direction of the liquid crystal on the lower substrate (e. g. TFT substrate) of the liquid crystal panel, and the absorption axis of the first polarizer 200 and the absorption axis of the second polarizer 300 are orthogonal; the E-mode refers to that the absorption axis of the second polarizer 300 located at the non-displaying side of liquid crystal panel is perpendicular to the orientation direction of the liquid crystal on the lower substrate (e. g. TFT substrate) of the liquid crystal panel, and the absorption axis of the first polarizer 200 and that of the second polarizer 300 are orthogonal.

Furthermore, in embodiments of the present disclosure, the scattering film, the reflective polarizer 500 and the second polarizer 300 forms an external composite film material, which is arranged on the transmissive liquid crystal panel 100 in a full lamination manner. In this way, the application process of the external film material is simple and the resultant product has a high stability.

Figure 3:
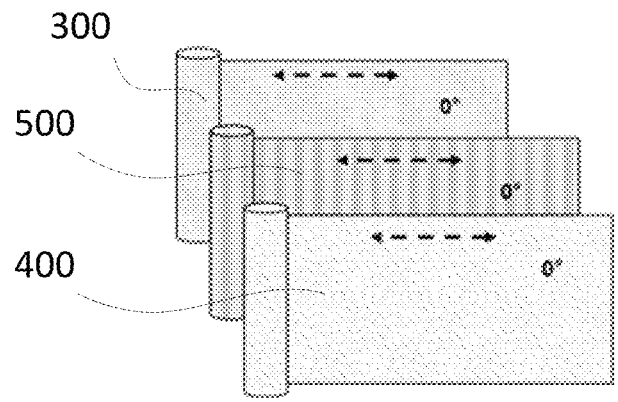
FIG. 3 is a schematic view of a roll-to-roll composite process for a scattering film, a reflective polarizer and a second polarizer.

In addition, the direction of the diffusion axis of the scattering film is parallel to the direction of the transmission axis of the reflective polarizer 500, and is consistent with the direction of the transmission axis of the second polarizer 300. The design is to achieve a roll-to-roll composite process for the composite film material including the scattering film, the reflective polarizer 500 and the second polarizer 300, thereby reducing the difficulty in the manufacturing process, improving the use efficiency of the film material and reducing the product cost. FIG. 3 is a schematic view of the roll-to-roll composite process for the scattering film, the reflective polarizer 500, and the second polarizer 300.

Figure 4:
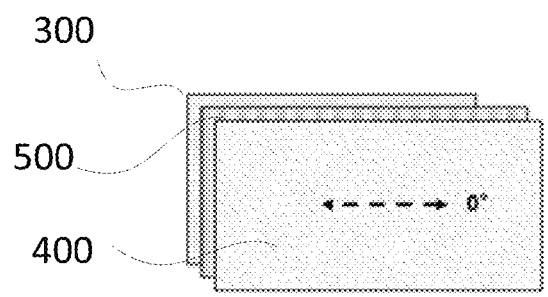
FIG. 4 is a schematic view of a composite film material having a scattering film with a 0-degree diffusion axis.
Figure 5:
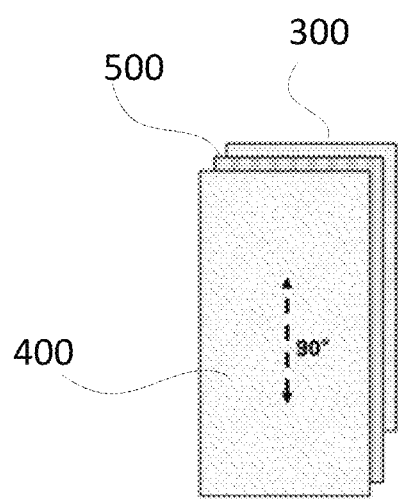
FIG. 5 is a schematic view of a composite film material having a scattering film with a 90-degrees diffusion axis.

In addition, in order to improve the efficiency of the scattering film, in practical applications, the direction of the diffusion axis of the scattering film is preferably parallel to the propagation direction of light from the light source. Therefore, according to the use scenario of the product, such as requirements regarding horizontal and vertical screens and requirements regarding indoor or outdoor, the direction of the diffusion axis of the scattering film may be adjusted to 0 degree (as shown in FIG. 4) or 90 degrees (as shown in FIG. 5), i.e., the angle of the external composite film material formed by the scattering film, the reflective polarizer 500 and the second polarizer 300 may be adjusted to 0 degree or 90 degrees, and the display mode may be adjusted to the E-mode or O-mode, accordingly. FIGS. 4 and 5 correspond to schematic views of composite film materials having a scattering film 400 with a 0-degree diffusion axis and 90-degrees diffusion axis, respectively. The transmission axis of the first polarizer 200 is perpendicular to the transmission axis of the second polarizer 300.

It should be noted that the above description is only an exemplary solution. In other embodiments, the direction of the diffusion axis of the scattering film and the direction of the transmission axis of the reflective polarizer 500 are not limit thereto.

Figure 6:
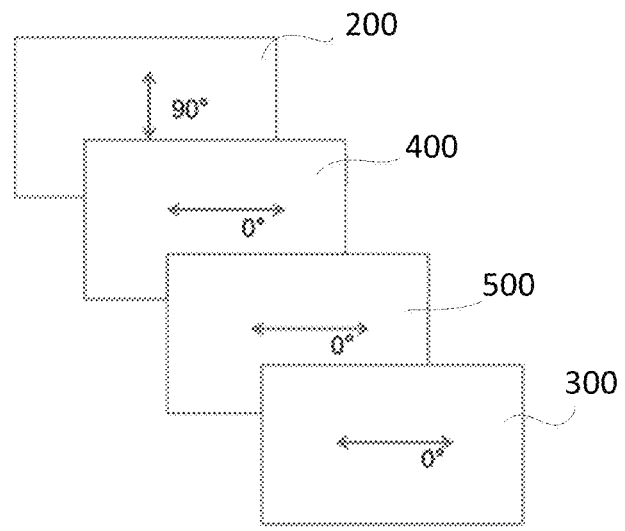
FIG. 6 is a schematic view of a fitting manner of an external composite film material for a display screen in ADS mode provided by embodiments of the present disclosure.
Figure 7:
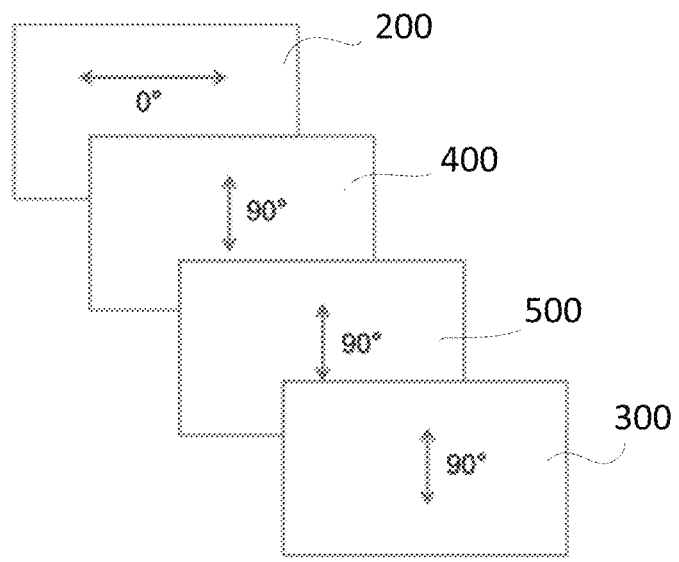
FIG. 7 is a schematic view of another fitting manner of an external composite film material for a display screen in ADS mode provided by embodiments of the present disclosure.

It should also be noted that FIG. 6 and FIG. 7 are two fitting manners of the external composite film material for the display screen in the ADS mode provided by embodiments of the present disclosure, and the angles shown in the figures denotes directions for the transmission axis of the polarizer, the diffusion axis of the scattering film and the transmission axis of reflective polarizer 500, respectively.

Figure 12:
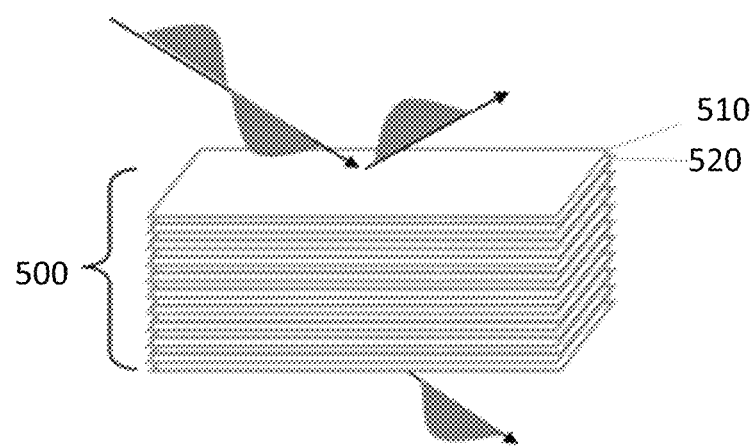
FIG. 12 is a structural schematic view of a reflective polarizer.

Further, in the display screen provided by embodiments of the present disclosure, as shown in FIG. 12, the reflective polarizer 500 comprises: a core layer formed by a plurality of birefringent material layers 510 and a plurality of non-birefringent material layers 520 that are alternately stacked on each other, wherein the refractive index of the birefringent material layer 510 is greater than the refractive index of the non-birefringent material layer 520.

Figure 13:
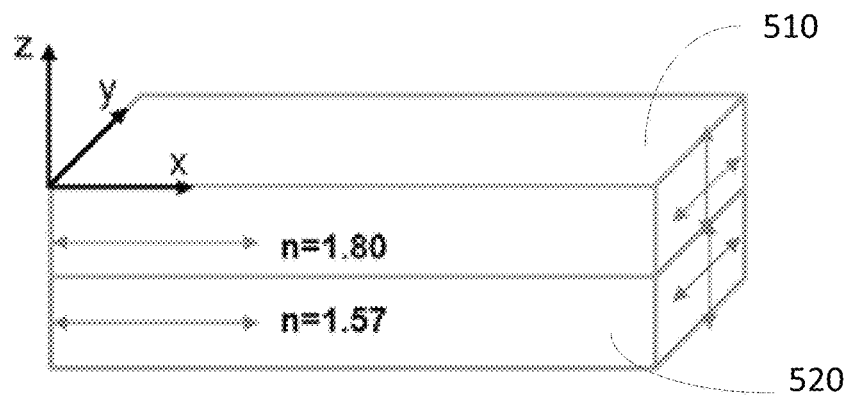
FIG. 13 is a diagram showing an optical path in a birefringent material and a non-birefringent material for a reflective polarizer.

As shown in FIG. 13, in the x-direction, the refractive index of birefringent material 510 is significantly higher than the refractive index of non-birefringent material 520. A beam of natural light will have a directional total reflection at an interface between the birefringent material layer 510 and the non-birefringent material layer 520, in which the light vibrating parallel to the x-direction will be reflected and the light vibrating parallel to the y-direction will be transmitted. After passing through the multiple layers of interfaces, the beam of natural light will be decomposed into two beams of polarized light having vibration direction perpendicular to each other, in which the light vibrating parallel to the x-direction is reflected back and the light vibrating parallel to the y-direction is transmitted. Similarly, when a linear polarized light vibrating parallel to the x-direction is incident on the surface of the reflective polarizer 500, most of the linearly polarized light will be reflected back with its original vibration direction kept, and when a linear polarized light vibrating perpendicular to the x-direction is incident on the surface of the core layer, most of the linear polarized light will be transmitted with its original vibration direction kept.

It is noted that, in the display screen provided by embodiments of the present disclosure, the surface of the reflective polarizer 500 is not subjected to any coating treatment.

In order to explain the display screen according to embodiments of the present disclosure in more detail, the polarization state of the backlight or the ambient light passing through various layers of the optical film material under the transmissive mode and reflective mode are exemplified below.

Table 1 shows the polarization states of the backlight or ambient light after passing through various layers of optical film material of the display screen under the transmissive mode according the embodiments as shown.

TABLE 1

| | Transmissive mode | |
| --- | --- | --- |
| Light transmission trajectory | White state (liquid crystal is operating) Light polarization state | Black state (liquid crystal is not operating) Light polarization state |
| Backlight | Natural light | Natural light |
| Second polarizer (0 degree) | 0-degree Linearly polarized light | 0-degree Linearly polarized light |
| Reflective polarizer (0 degree) | 0-degree Linearly polarized light | 0-degree Linearly polarized light |
| Scattering film | 0-degree Linearly polarized light | Elliptically polarized light (containing 0-degree and 90-degrees linearly polarized light components) |
| Liquid crystal | 90-degrees Linearly polarized light | Elliptically polarized light (containing 0-degree and 90-degrees linearly polarized light components) |
| First polarizer (90 degree)/ Environment | 90-degrees Linearly polarized light | 90-degrees Linearly polarized light |

Table 2 shows the polarization states of the backlight or ambient light after passing through various layers of optical film material of the display screen under the reflective mode according the embodiments as shown.

TABLE 2

| | Reflective mode | |
| --- | --- | --- |
| Light tansmission trajectory | White state (liquid crystal is operating) Light polarization state | Black state (liquid crystal is not operating) Light polarization state |
| Environment | Natural light | Natural light |
| First polarizer (0 degree) | 0-degree Linearly polarized light | 0-degree Linearly polarized light |
| Scattering film | 0-degree Linearly polarized light | 0-degree Linearly polarized light |
| Liquid crystal | 0-degree Linearly polarized light | Elliptically polarized light (containing 0-degree and 90-degrees linearly polarized light components) |
| Reflective polarizer (90 degree) | Reflecting 0-degree linearly polarized light back | Reflecting 0-degree linearly polarized light back, while transmitting 90-degrees linearly polarized light |
| Liquid crystal | 0-degree Linearly polarized light | Elliptically polarized light (containing 0-degree and 90-degrees linearly polarized light components) |
| Scattering film | 0-degree Linearly polarized light | Elliptically polarized light (containing 0-degree and 90-degrees linearly polarized light components) |
| First polarizer (0 degree)/Ambient | 0-degree Linearly polarized light | 0-degree Linearly polarized light |

The display screen in the embodiments of the present disclosure has two display modes including the transmissive mode and reflective mode which can correspond to an outdoor environment with strong light and an environment with dim light, where the environment with dim light is similar to an indoor lighting environment. That is, the display system having two uses including reflecting and transmitting can be adapted to both indoor environment and outdoor environment.

The above is a description on the structure of the display screen which can realize two functions including the transmissive mode and the reflective mode. To realize the transmissive mode and reflective mode of the display screen, a corresponding circuit design is also provided to implement an automatically switching between the transmissive mode and reflective mode according to the ambient illuminance.

Figure 14:
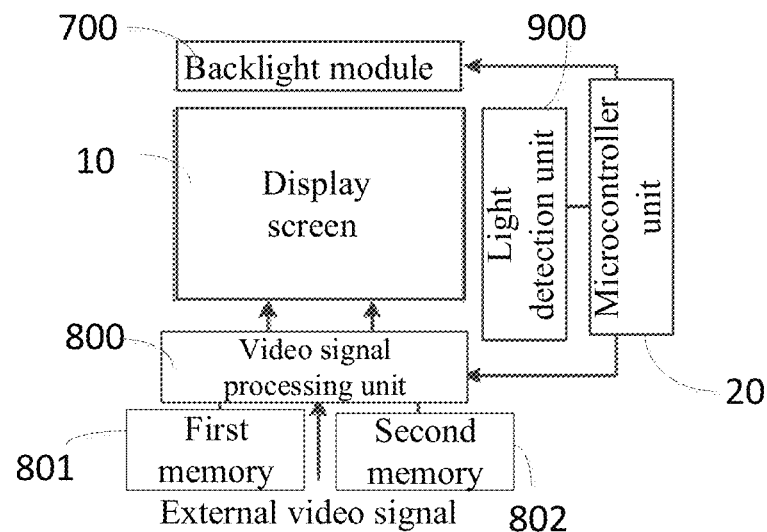
FIG. 14 is a schematic view showing a solution for processing and converting a display signal by a display apparatus using a video signal in real time provided by the present disclosure.

As shown in FIGS. 1 and 14, embodiments of the present disclosure also provides a display apparatus, comprising:
a display screen 10 provided by the embodiments of the present disclosure;
a backlight module 700, configured for providing a light source to the display screen 10;
a video signal processing unit 800 connected to the display screen 10, configured for controlling a video display signal of the display screen 10;
a light detection unit 900, configured for obtaining ambient light data; and
a microcontroller unit 20 connected to the light detection unit 900, the video signal processing unit 800 and the backlight module 700, the microcontroller unit 20 is configured for generating a mode switching signal according to the ambient light data collected by the light detection unit 900, and controlling operating states of the backlight module 700 and the video display unit to cause the display apparatus to be switched between a transmissive mode and a reflective mode,
where in the transmissive mode, the backlight module 700 is turned on, and the video signal processing unit 800 sends a first image display signal to the display screen 10; and in the reflective mode, the backlight module 700 is turned off, the video signal processing unit 800 sends a second image display signal to the display screen 10, and an image grayscale of the first image display signal is complementary to an image grayscale of the second image display signal.

In the display apparatus provided by the present disclosure, the display screen 10 of the display apparatus cooperates with the circuit control system, such that the transmissive mode and reflective mode can be realized. Specifically, the circuit control system comprises the video signal processing unit 800, the light detection unit 900, the microcontroller unit 20. The video signal processing unit 800 is configured for converting video signals and performing a grayscale processing on the video signals for two display modes including the transmissive mode and reflective mode, in which the conversion of the two display modes is mainly performed according to the mode switching signal of microcontroller unit 20 (MCU). The light detection unit is configured for obtaining an ambient light signal, and transmitting the collected light signal data to the microcontroller unit 20. The microcontroller unit 20 is configured for determining a display mode according to the ambient light data collected by the light detection unit 900, and notifying the video processing module and the backlight module 700 to perform a mode switching. The backlight module 700 is configured to be turned off in the reflective mode, and to be turned on in the transmissive mode, and to adjust backlight brightness in the transmissive mode according to backlight brightness information provided by the microcontroller unit 20. Namely, when being switched to the transmissive mode, the backlight module 700 can adjust the backlight brightness according to a specific ambient light brightness.

The display apparatus provided by embodiments of the present disclosure is described in more detail hereinafter.

Firstly, it should be noted that the switching of display modes for the display apparatus provided by the embodiments of the present disclosure mainly depends on the ambient light. For example, in an outdoor environment with dim light when the ambient illuminance is, e.g., below a first critical value (e. g. 5000 lx), the display apparatus switches to the transmissive mode, the backlight is on, the video signal processing unit 800 outputs a first image signal, and the display screen 10 displays a normal grayscale image. In an outdoor environment with strong light, for example, when the ambient illuminance is above the first critical value (e. g. 5000 lx), the display system needs to be switched to the reflective mode, the backlight is off, the video signal processing unit 800 outputs a second image signal, and the display screen 10 displays an image complementary to the normal grayscale image (i.e. inverse color). Therefore, the accuracy for collecting the ambient light data is important.

In some embodiments of the present disclosure, the light detection unit 900 may include a light collector, the light collector is arranged all around the display screen 10 for obtaining the ambient light data.

In order to improve the accuracy of the collected signal of the light collector and prevent a local shielding or an individual damage from affecting the overall function, a plurality of light sensors may be arranged, for example, m host sensors 910 and n secondary sensors 920, where m and n are positive integer greater than or equal to 2. The host sensors 910 are arranged at a top position of the display screen 10 when it is in use, and the secondary sensors 920 is arranged at a bottom position of the display screen 10 when it is in use.

Figure 16:
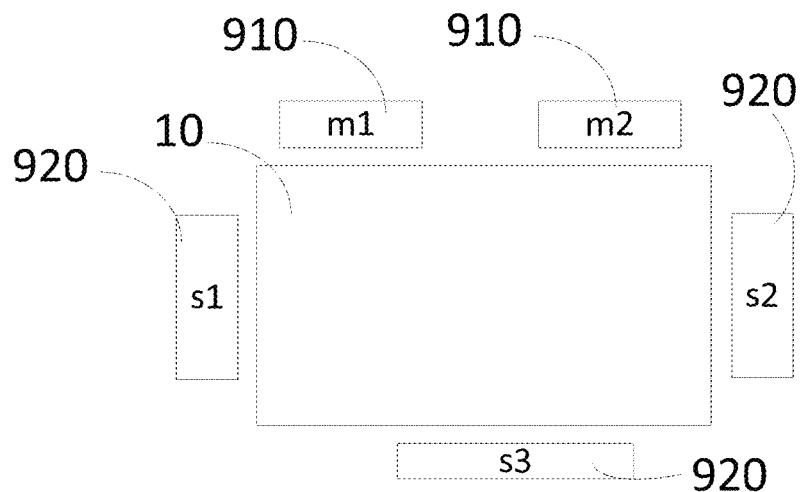
FIG. 16 is a partial schematic view of a light collector in a display apparatus provided by the present disclosure.

For example, different numbers of light sensors may be provided according to different product sizes. As shown in FIG. 16, for example, five light sensors may be provided, where two sensors are provided at the top of the display screen 10, which can obtain light data better, and can prevent possible shielding at the bottom or side(s) of the display screen 10 from affecting the function as the top position is not shielded generally. 3 sensors may be provided at the bottom and the side(s) position.

It should be understood that, in practical applications, the quantity of light sensors and the position for arranging the same are not limited thereto, and the quantity of light sensors may be increased or decreased accordingly depending on the size of the display screen 10.

The microcontroller unit 20 comprises: a data analyzer connected to the light collector, configured for processing and analyzing the light signal collected by the light collector to obtain the ambient light parameter L; a signal generator, for sending a first signal to the backlight module 700 and to the video signal processing unit 800 when the ambient light parameter L is greater than a first critical value, to enable the display apparatus to switch to the reflective mode, and sending a second signal to the backlight module 700 and to the video signal processing unit 800 when the ambient light parameter L is less than the first critical value or when receiving a signal indicating a damage to the light collector, to enable the display apparatus to switch to the transmissive mode.

The data analyzer specifically comprises:

a first determiner, configured for determining the quantity m' for host sensors 910 that have collected light data, where m' is 0 or a positive integer less than or equal to m;

a first comparator connected to the first determiner, configured for determining, by comparison, whether a difference value for the light data collected by the m' host sensors 910 is within a first predefined threshold in a case that m' is a positive integer less than or equal to m;

a first data calculator connected to the first comparator, configured for calculating, in a case the difference value for the light data collected by the m' host sensors 910 is within the first predefined threshold, an average value for the light data of the m' host sensors 910 to obtain first data $L_{M1}$, $L_{M1}=(M_1+M_2 \ldots M_{m'})/m'$, where $M_{m'}$ is light data of an m'-th host sensor 910;

a second determiner, configured for determining the quantity n' for secondary sensors 920 that have collected light data, where n' is 0 or a positive integer less than or equal to n;

a second comparator, the second comparator is connected to the second determiner, and is configured for determining, by comparison, whether a difference value for light data collected by the n' secondary sensors 920 are within a second predefined threshold in a case that n' is a positive integer less than or equal to n;

a second data calculator, configured for calculating an average value for the light data of the x secondary sensors 920 to obtain second data $L_{S1}$, $L_{S1}=(S_1+S_2 \ldots S_x)/x$, in a case that a difference value for light data collected by each of x secondary sensors 920 from the n' secondary sensors 920 is within the second predefined threshold, and in a case that a difference value for light data collected by remaining (n–x) secondary sensors 920 exceeds the second predefined threshold, where $S_x$ is light data of an x-th secondary sensor 920, and x is a positive integer less than or equal to n;

a third data calculator connected to the first data calculator and the second data calculator, the third data calculator is configured for obtaining, according to the first data $L_{M1}$ and the second data $L_{S1}$, the ambient light parameter $L=L_{M1}+|L_{s1}-L_{M1}|/(m'+x)$;

a third comparator connected to the first comparator and the second data calculator, the third comparator is configured for determining, by comparison, whether a difference value between light data collected by each host sensor 910 from the m' host sensors 910 and the second data $L_{S1}$ is within a third predefined threshold in a case that the difference value for the light data collected by the m' host sensors 910 exceeds the first predefined threshold and the difference value for the light data collected by the n' secondary sensors 920 are within the second predefined threshold;

a fourth data calculator connected to the third comparator, the fourth data calculator is configured for calculating an average value for light data of y host sensors 910 to obtain fourth data $L_{M2}$, $L_{M2}=(M_1+M_2 \ldots M_y)/y$, in a case that the difference value between the light data collected by the y host sensors 910 from the m' host sensors 910 and the second data $L_{S1}$ is within the third predefined threshold, and in a case that the difference value for light data collected by the remaining (m'–y) host sensors 910 exceeds the third predefined threshold, where $M_y$ is the light data of the y-th host sensor 910;

a fifth data calculator connected to the fourth data calculator and the second data calculator, the fifth data calculator is configured for obtaining, according to the fourth data $L_{M2}$ and second data $L_{S1}$, the ambient light parameter $L=L_{M2}+|L_{S1}-L_{M2}|/(y+x)$;

a fourth comparator connected to the first comparator and the second comparator, the fourth comparator is configured for determining, by comparison, whether a difference value between the light data collected by each of the m' host sensors 910 and pre-stored light data, and a difference value between the light data collected by each of the n' secondary sensors 920 and the pre-stored light data are within a fourth predefined threshold in a case that the difference value for the light data collected by the n' secondary sensors 920 exceeds the second predefined threshold and the difference value for the light data collected by the m' host sensors 910 exceeds the first predefined threshold;

a sixth data calculator connected to the fourth comparator, configured for obtaining $L=L_{M3}+|L_{s3}-L_{M3}|/(y'+x')$ according to light data from y' host sensors 910 and x' secondary sensors 920, wherein a difference value between light data collected by each of the y' host sensors 910 from the m' host sensors 910 and the pre-stored light data is within the fourth predefined threshold, and a difference value between light data collected by each of the x' secondary sensors 920 from the n' secondary sensors 920 and the pre-stored light data is within the fourth predefined threshold, where $L_{M3}=(M_1+M_2 \ldots M_{y'})/y'$, where $M_{y'}$ is light data of the y'-th host sensor 910; and $L_{s3}=(S_1+S_2 \ldots S_{x'})/x'$, where $S_{x'}$ is light data of the x'-th secondary sensor 920, and y' and x' are both positive integers less than or equal to n;

a seventh data calculator connected to the first determiner, the second determiner and the second data calculator, the seventh data calculator is configured for calculating the ambient light parameter $L=L_{S1}$ in a case that the m' is 0 and n' is a positive integer less than or equal to n;

a third determiner connected to the first determiner and second determiner, the third determiner is configured for determining that the light collector is damaged in a case that the m' is 0 and n' is 0, and sending a signal indicating a damage to the light collector to the signal generator; and a fourth determiner connected to the fourth comparator, configured for determining that the light collector is damaged, and sending the signal indicating the damage to the light collector to the signal generator, in a case that the difference value for the light data collected by the n' secondary sensors 920 exceeds the second predefined threshold, and the difference value for the light data collected by the m' host sensors 910 exceeds the first predefined threshold, and the difference value between the light data collected by each of the m' host sensors 910 and the pre-stored light data exceeds the fourth predefined threshold, and the difference value between the light data collected by each of the n' secondary sensors 920 and the pre-stored light data exceeds the fourth predefined threshold.

For a better understanding, the process for processing and analyzing light signal data by the microprocessor is illustrated in details below in connection with a specific embodiment.

In an example in which the distribution of the light sensors is shown in FIG. 16, two light sensors arranged at the top of the display screen 10 are host sensors 910, which are m1 and m2, respectively. One secondary sensor 920 is arranged at each of the left side, the right side and the bottom of the display screen 10, which are s1, s2 and s3, respectively.

In the process of ambient light collection and determination, m1 and m2 are the main sources for the light data, and data from s1, s2 and s3 is used as the adjustment parameters. The data of the secondary sensors 920 may be used as the major basis for the determination only when a data abnormality occurs.

The specific data analyzing process is as follows.

Step S01, the quantity m' for host sensors 910 that have collected light data is determined. If m' is a positive integer greater than or equal to 0, Step S02 is to be executed; if m'=0, Step S012 or Step S013 is to be executed.

Step S02, when m' is a positive integer less than or equal to m, whether the light data collected by the m' host sensors 910 is within a first predefined threshold is determined by comparison. The first predefined threshold may be a preset allowed error value. In other words, it is determined whether the light data of the m' host sensors 910 are close to each other; if yes, Step S03 is to be executed, and if no, Step S08 is to be executed.

For example, when m'=2, namely, both m1 and m2 have collected the light data and sent same to the data analyzer, whether the light data of the two host sensors 910 are close to each other are determined by comparison.

Step S03, when the light data of the m' host sensors 910 are close, an average value for the light data of the m' host sensors 910 is calculated to obtain first data $L_{M1}$, $L_{M1}=(M_1+M_2 \ldots M_{m'})/m'$, wherein $M_{m'}$ is the light data of the m'-th host sensor 910.

For example, taking the embodiment shown in FIG. 16 as an example, when m'=2, $L_{M1}=(M_1+M_2)/2$, $M_1$ is the light data collected by the host sensor 910m1, and $M_2$ is the light data collected by the host sensor 910m2.

Step S04, the quantity n' for the secondary sensors 920 that have collected light data is determined. If n' is a positive integer greater than or equal to 0, Step S05 is to be executed; if n'=0, Step S013 is to be executed.

Step S05, when n' is a positive integer less than or equal to n, whether the difference value for the light data collected by the n' secondary sensors 920 is within a second predefined threshold is determined by comparison, wherein the second predefined threshold may be a pre-set allowed error value. In other words, whether the light data of the n' secondary sensors 920 are close to each other is determined by comparison; if yes, Step S06 is to be executed; if not, Step S08 is to be executed.

Step S06, when the difference value for the light data collected by x secondary sensors 920 from the n' secondary sensors 920 is within the second predefined threshold, and when the difference value for the light data collected by the remaining (n−x) secondary sensors 920 exceeds the second predefined threshold, an average value for the light data of the x host sensors 910 is calculated to obtain second data $L_{S1}$, $L_{S1}=(S_1+S_2 \ldots S_x)/x$, wherein $S_x$ is the light data of the x-th the secondary sensor 920, and X is a positive integer less than or equal to n.

For example, in the embodiment shown in FIG. 16, when the light data of three secondary sensors 920 are all satisfy the second predefined threshold, $L_{S1}=(S_1+S_2+S_3)/3$, $S_1$ is the light data of secondary sensor s1, $S_2$ is the light data of secondary sensor s2, and S3 is the light data of secondary sensor s3.

It is noted that if the light data of either sensor in the host sensors 910 or the secondary sensors 920 deviates significantly, the light data of that sensor may be read again, and if the data still deviates successively for a predetermined times, the data is determined to be abnormal, and the abnormal data of the secondary sensor 920 is discarded, the calculation is not performed thereon.

For example, when the difference value for the light data of x secondary sensors 920 among the three secondary sensors 920 is within the second predefined threshold, and the difference value for the light data collected by the remaining 3-x secondary sensors 920 exceeds the second predefined threshold, an average value for only the light data of the x the secondary sensors 920 is calculated to obtain second data $L_{S1}$, $L_{S1}=(S_1+S_2 \ldots S_x)/x$. For example, x=2, in this case, $L_{S1}=(S_1+S_2)/2$; as another example, x=1, in this case, $L_{S1}=S_1$, $L=L_{M1}+|L_{S1}-L_{M1}|/3$.

Step S07, the ambient light parameter $L=L_{M1}+|L_{S1}-L_{M1}|/(m'+x)$ is calculated according to the first data $L_{M1}$ and second data $L_{S1}$.

For example, when the light data of 3 host sensors 910 satisfy the allowable error and the light data of 2 secondary sensors 920 satisfy the allowable error, m'=2 and x=3, and $L=L_{M1}+|L_{S1}-L_{M1}|/5$.

For another example, when the difference value for the light data of 2 secondary sensors 920 from the 3 secondary sensors 920 is within the second predefined threshold, and the difference value for the light data collected by the remaining 1 secondary sensor 920 exceeds the second predefined threshold, in this case, x=2, and $L_{S1}=(S_1+S_2)/2$, $L=L_{M1}+|L_{S1}-L_{M1}|/(m'+x)$, namely, $L=L_{M1}+|L_{S1}-L_{M1}|/4$.

For still another example, x=1, in this case, $L_{S1}=S_1$, $L=L_{M1}+|L_{S1}-L_{M1}|/3$.

Step S08, when a difference value between the light data collected by each of y host sensors 910 from the m' host sensors 910 and the second data $L_{S1}$ are within a third predefined threshold, while the difference value for the light data collected by the remaining (m'−y) the host sensor 910 exceeds the third predefined threshold, an average value for the y host sensors 910 is calculated to obtain fourth data $L_{M2}$, $L_{M2}=(M_1+M_2 \ldots M_y)/y$, where $M_y$ is the light data of the y-th the host sensor 910, and y is a positive integer less than or equal to m'.

For example, taking the embodiment shown in FIG. 16 as an example, both the host sensor 910m1 and the host sensor 910m2 have data, but the data difference exceeds an error range. In such case, Step S05 is to be executed for determining, by comparison, whether the data difference of the three secondary sensors 920 is within an error range. If so, Step S06 is to be executed, and after the second data $L_{S1}$ is obtained, Step S09 is to be executed; if not, Step S010 is to be executed.

Step S09, the second data $L_{S1}$ is compared with each data from the host sensor 910m1 and the host sensor 910m2, and the data from the host sensor 910m1 or the host sensor 910m2 with a greater deviation are discarded. In such case, obtaining fourth data $L_{M1}=M_1$ or $L_{M1}=M_2$; then Step S07 is to be executed to obtain $L=L_{M1}+|L_{S1}-L_{M1}|/4$.

Step S010, when the difference value for the light data collected by the n' secondary sensors 920 exceeds the second predefined threshold and the difference value for the light data collected by the m' host sensors 910 exceeds the first predefined threshold, it is determined, by comparison, whether the difference value between the light data collected by each of the m' host sensors 910 and the pre-stored light data, the difference value between the light data collected by each of the n' secondary sensors 920 and the pre-stored light data are within the fourth predefined threshold. If so, Step S011 is to be executed; if no, step S014 is to be executed.

Step S011, $L=L_{M3}+|L_{s3}-L_{M3}|/(y'+x')$ is obtained according to the light data collected by y' host sensors 910 and x' secondary sensors 920, wherein a difference value between the light data collected by each of the y' host sensors among the m' host sensors 910 and the pre-stored light data is within the fourth predefined threshold, and a difference value between the light data collected by each of the x' secondary sensors 920 among the n' secondary sensors 920 and the pre-stored light data is within the fourth predefined threshold, wherein $L_{M3}=(M_1+M_2 \ldots M_{y'})/y'$, wherein $M_{y'}$ is the light data of the y'-th host sensor 910; $L_{s3}=(S_1+S_2 \ldots S_{x'})/x'$, wherein $S_{x'}$ is the light data of the x'-th secondary sensor 920, and y' and x' are both positive integer less than or equal to n.

Hereinafter, the above-mentioned Step S10 and Step S011 are illustrated in an example.

Taking the embodiment shown in FIG. 16 as the example, the host sensor 910m1 and host sensor 910m2 both have data, but the data difference exceeds the error range. In this case, the data of 3 secondary sensors 920 are compared; if there is also a data deviation for the 3 secondary sensors 920, at least one of the following two situations may occur: some of sensors are exposed to a strong light, or the sensors are shielded partly. In such case, a comparative analysis with a previous data array needs to be performed to remove the data array with a larger deviation, and keep the remaining data for averaging.

Step S012, when the m' is 0 and n' is a positive integer less than or equal to n, calculating the ambient light parameter $L=L_{S1}$.

Step S013, when the m' is 0 and n' is 0, it is determined that the light collector is damaged, and a signal indicating a damage to the light collector is sent to the signal generator.

Step S014, when the difference value for the light data collected by the n' secondary sensors 920 exceeds the second predefined threshold, and the difference value for the light data collected by the m' host sensors 910 exceeds the first predefined threshold, and the difference value between the light data collected by each of the m' host sensors 910 and the pre-stored light data, the difference value between the light data collected by each of the n' secondary sensors 920 and the pre-stored light data exceed the fourth predefined threshold, it is determined that the light collector is damaged, and a signal indicating a damage to the light collector is sent to the signal generator.

The above Steps S012, S013 and S014 are described as follows.

If the data values from host sensors 910 deviate greatly from those from the secondary sensors 920, or there is a failure for each host sensor 910, it is directly determined whether current states of the secondary sensors 920 are normal. If so, calculating L=Ls/3; if not, it is switched to the transmissive mode, the backlight is turned on, and the damage situation is reported, to wait for a maintenance.

The above description is about how the microcontroller unit 20 analyzes the light data to determine whether the mode switching is needed. The following description is about how the microcontroller unit 20 and the video signal processing unit 800 control the displaying under different display modes.

In the display apparatus provided by the embodiments of the present disclosure, a grayscale complementary transformation is performed for signals in the transmissive mode and the reflective mode. The following explains the color display principle of the display apparatus in two modes.

For the transmissive mode, a signal format conversion may be performed according to the requirement of the display end, to output a normal output. For the reflective display mode, the signal may be processed with an inverse color treatment and then outputted.

Namely, the color of a certain pixel point in an original image is set as Greyx (Rx, Gx, Bx), for a conventional display screen 10, the grayscale distribution is 0 to 255, the display grayscale shall follow the following formulas in the transmissive mode and the display mode.

Transmissive mode:

$$\text{Grey}_T = \text{Grey}_x = \begin{Bmatrix} R_x \\ G_x \\ B_x \end{Bmatrix}$$

Reflective mode:

$$\text{Grey}_F = \text{Grey}_{255} - \text{Grey}_x = \begin{Bmatrix} R_{255-x} \\ G_{255-x} \\ B_{255-x} \end{Bmatrix}$$

Figure 17:
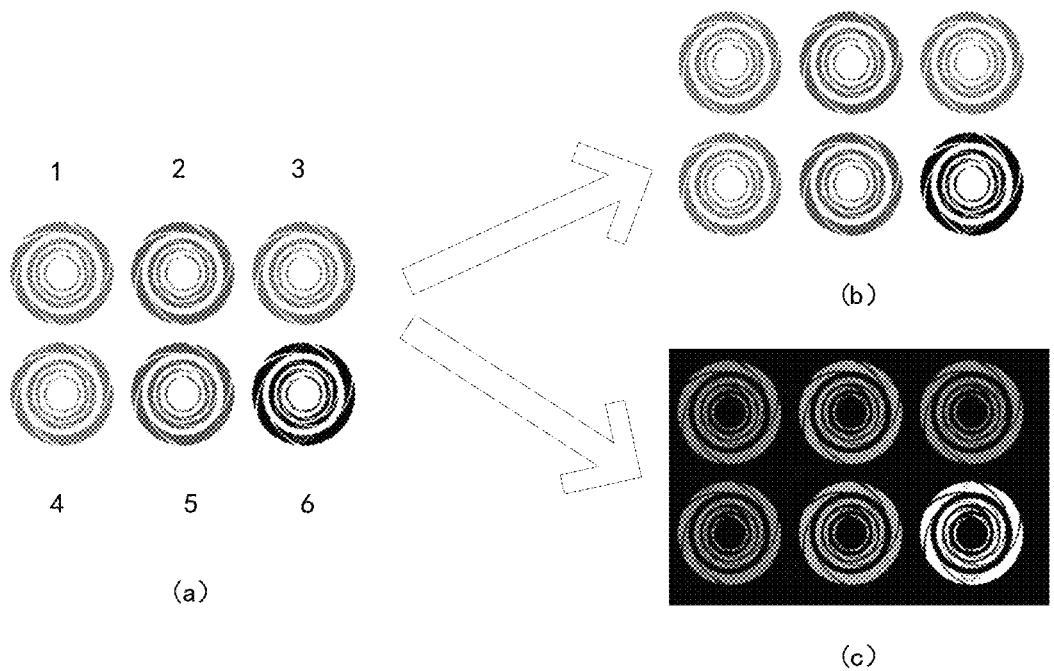
FIG. 17 is a schematic view of a grayscale display for a display apparatus in both transmissive mode and reflective mode provided by embodiments of the present disclosure.

As shown in FIG. 17 (*a*), the original display image is white with color circular patterns thereon. As shown in FIG. 17 (*b*), in the transmissive mode, the grayscale for the color circular patterns No. 1-6 is unchanged, and the background color is still white. The grayscale values corresponding to the color circular patterns are shown in Table 3.

TABLE 3

|   | 1 | 2 | 3 | 4 | 5 | 6 |
|---|---|---|---|---|---|---|
| R | 239 | 0 | 149 | 255 | 156 | 0 |
| G | 45 | 132 | 248 | 190 | 35 | 0 |
| B | 36 | 200 | 14 | 14 | 146 | 0 |

In the case that the display mode is the reflective mode, the display image is subjected to a grayscale complementary processing, and the image on which the processing is performed is shown in FIG. 17(*c*), and the gray-scale values are shown in Table 4.

TABLE 4

|   | 1 | 2 | 3 | 4 | 5 | 6 |
|---|---|---|---|---|---|---|
| R | 16 | 255 | 106 | 0 | 99 | 255 |
| G | 210 | 123 | 7 | 65 | 220 | 255 |
| B | 219 | 55 | 241 | 241 | 109 | 255 |

There are two implementation schemes for the grayscale processing, that is, performing a real-time conversion by the video processing unit, and performing a display grayscale inverse by the video processing unit.

These two schemes are described in detail below.

First Scheme:
the video signal processing unit 800 is specifically configured for:
outputting the video signal directly in a point-to-point mode so as to enable the display screen 10 to perform a normal grayscale display in a case that the first signal for switching the display apparatus to the transmissive mode is received; and
performing an inverse color processing on the video signal and outputting the processed video signal, so as to enable the display screen 10 to perform a normal grayscale display in a case that the second signal for switching the display apparatus to the reflective mode is received.

As shown in FIG. 14, this scheme adopts a real-time processing and converting on the video signal. The video signal processing unit 800 can also carry out image processing in real time in addition to the conventional video processing function. For example, the reflective mode is denoted as mode1 and the transmissive mode is denoted as mode2. When the display mode is mode 1, a program in the first memory 801 is called by the video signal processing unit 800, and the grayscale complementary processing is performed with an ACC module included in the video signal processing unit 800. After the processing is completed, the processed signal is outputted to a cache, and the display screen 10 displays according to grayscale information. When the display mode is mode2, a program in the second memory is called by the video signal processing unit, and a point-to-point mode is adopted for the video information, the signal is outputted directly to the cache without any processing, and the display screen 10 displays according to the grayscale information.

Second Scheme:
the video signal processing unit 800 specifically comprises:
a display drive unit;
a T-con circuit 803 connected to the microcontroller unit, configured for receiving the mode switching signal of the microcontroller unit 20;
a first gamma chip 804 and a second gamma chip 805 integrated on the T-con circuit 803, wherein the first gamma chip 804 is configured for generating grayscale information in the transmissive mode and generating a corresponding gamma voltage, and the second gamma chip 805 is configured for generating grayscale information in the reflective mode and generating a corresponding gamma voltage; and
a multiplexer switch 806 connected between the T-con circuit 803 and the display drive unit, configured for outputting corresponding grayscale information to the display drive unit according to the received mode switching signal.

Figure 15:
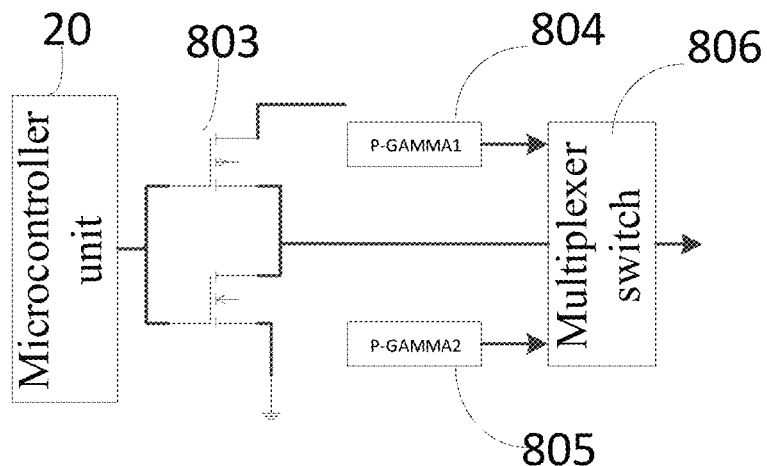
FIG. 15 is a schematic view of processing a display signal by a display apparatus using a display grayscale inverse scheme provided by the present disclosure.

In the above-mentioned scheme, as shown in FIG. 15, the video processing unit output display signal with the point-to-point mode in both transmissive mode and reflective mode in the scheme of performing display grayscale inverse. The microcontroller unit 20 provides the mode switching signal directly to the mode switching circuit as shown in FIG. 15. Two P-GAMMA chips are integrated in the T-con circuit 803 for generating two different sets of grayscale information, wherein P-GAMMA1 generates grayscale information in the transmissive mode, and P-GAMMA2 generates grayscale information in the reflective mode. The generated Gamma voltage is provided to a drive IC via the multiplexer switch 806. The multiplexer switch 806 determines which gamma voltage is to be inputted based on the mode switching signal of the microcontroller unit 20.

In some embodiments, in order to improve the driving capability and stability, an MOS transistor may be used to from a driving switch circuit, so as to realize a stable and reliable switch driving.

In the display apparatus provided by embodiments of the present disclosure, two display modes including the transmissive mode and reflective mode can be realized, and the two display modes are for switching backlight brightness according to the intensity of the ambient light so as to maintain the overall display effect. In addition, the overall power consumption at night can also be reduced, so as to achieve the effect of saving energy and reducing consumption. This is described in detail below.

The microcontroller unit 20 further comprises:

a first timer, configured for starting a timing in a case that the ambient light parameter L collected by the light detection unit 900 is greater than or equal to a first critical value; and a first judger, configured for determining whether the ambient light parameter L remains to be greater than or equal to the first critical value within a predetermined time period lasted from the start of timing; determining that the display apparatus needs to be switched to the reflective mode in case of a positive determination; and determining that the display apparatus does not need to be switched to the reflective mode in case of a negative determination.

Specifically, the microcontroller unit 20 further includes:

a first signal generator, configured for generating, in a case that the ambient light parameter L is greater than the first critical value and is in a descending state, a mode switching signal when the ambient light parameter L falls to the first critical value, to control the display apparatus to switch to the transmissive mode; obtaining a backlight brightness value Lbl of the backlight module 700 according to a liquid crystal panel surface brightness Lts=Lbl*β, wherein β is a transmittance of the liquid crystal panel; and controlling the operating state of the backlight module 700 according to the backlight brightness value Lbl;

a second signal generator, configured for controlling the backlight brightness value Lbl of the backlight module 700 to remain unchanged in a case that the ambient light parameter L is less than the first critical value, and is in a descending state and greater than a second critical value;

a third signal generator, configured for starting a timing when the ambient light parameter L reaches the second critical value, and determining whether the ambient light parameter L remains to be less than the second critical value within a predetermined time period lasted from the start of the timing; and controlling the backlight brightness of the backlight module 700 to decrease to Lbl/z in case of a positive determination, where z is a positive integer greater than 1;

a fourth signal generator, configured for starting a timing when the ambient light parameter L increases from a value below the second critical value to a value above the second critical value; determining whether the ambient light parameter L remains to be greater than the second critical value within a predetermined time period lasted from the start of the timing; and controlling the backlight brightness of the backlight module 700 to increase to the value Lbl in case of a positive determination; and a fifth signal generator, configured for generating a mode switching signal when the ambient light parameter L increases to the first critical value, controlling the display apparatus to switch to the transmissive mode and controlling the backlight module 700 to be turned off.

It is noted that, in the above-mentioned scheme, the first critical value and the second critical value may be preset in the system or set by a user, and the specific values for the first critical value and the second critical value is not limited. In order to facilitate understanding the above-mentioned scheme, the description will be given by taking the case where the first critical value is 5000 lx and the second critical value is 500 lx.

Step I, according to the setting condition, the first critical value 5000 lx is taken as a switching point, the display mode is switched to the reflective mode when the brightness of the ambient light is higher than 5000 lx, and the display mode is switched to the transmissive mode when the brightness of ambient light is smaller than 5000 lx.

Step II, a first timer T1 is arranged inside the microcontroller unit 20 to prevent an incorrect determination, the first timer T1 is configured for determining whether the mode needs to be switched at a current time instant. For example, the first timer T1 sets a timing, for example, 5 minutes. In a case that the light brightness of the ambient light exceeds the first critical value, and a duration for this case lasts for more than 5 minutes, the display mode is switched to the reflective mode; otherwise, it is determined that an abnormal situation occurs (being illuminated by a vehicle light in a dark environment, or being shielded by an object in a bright environment), and no switching is performed.

Step III, when the light brightness of the ambient light is in a falling state, and the light brightness of the ambient light falls to about 5000 lx, the display apparatus may be switched to the transmissive mode as the ambient light changes, and a backlight brightness value Lbl for the current mode is obtained according to the surface brightness Lts=Lbl*β of the display screen 10 (for example, the backlight brightness value Lbl is 10000 nit or more), where β is a transmittance of the liquid crystal screen;

Step V, when the ambient light continues to decrease, the backlight brightness value Lbl may be kept unchanged; when the light brightness of the ambient light falls below the second critical value 500 lx, a further determination regarding whether the display apparatus should enter a standby mode is made. A second timer T2 for the standby mode is provided in the microcontroller unit 20. The second timer T2 starts a timing, for example, if the timing T2>1 minute, it is determined that it is in a state of deep night, and the backlight brightness may be adjusted to 1/z*Lbl. For example, in a case that z=2, the backlight brightness may be adjusted to ½*Lbl (for example, the backlight brightness value ½*Lbl is 5000 nit).

Step VI, when the ambient light exceeds the second threshold value 500 lx again, the second timer T2 starts a timing. If the timing T2>1 minute, it is determined that the display apparatus returns to the normal operation mode, and thus the backlight brightness is recovered to the normal value Lbl until the light brightness of the ambient light reaches the first critical value 5000 lx. Then, the display apparatus is switched to the reflective mode again. The steps I-VI is repeated.

The specific operation processes for the display apparatus provided by embodiments of the present disclosure are described as follows.

The host sensor(s) 910 and the secondary sensor(s) 920 in the light sensor obtain ambient light data in real time, and send all the ambient light data to microcontroller unit 20.

The microcontroller unit 20 divides the received ambient light data into data from the host sensor(s) 910 and data from the secondary sensor(s) 920, and performs a data determination to obtain an accurate ambient light parameter L (if only the host sensor 910 is used, the determination only performs a comparison between two groups of data, and a comparison with historical data, and whether the current data can be used or not is determined according to the result of the comparison).

The microcontroller unit 20 determines whether to keep the current display mode or not according to the ambient light parameter L, and sends a mode switching signal to the video signal processing unit 800 for switching the display mode when the condition for mode switching is met. The microcontroller unit 20 also determines, according to the ambient light parameter L, whether to turn on the backlight or not, and a corresponding backlight brightness value.

The video signal processing unit 800 receives the mode switching signal, and switches to a corresponding display mode according to the mode switching signal.

Figure 18:
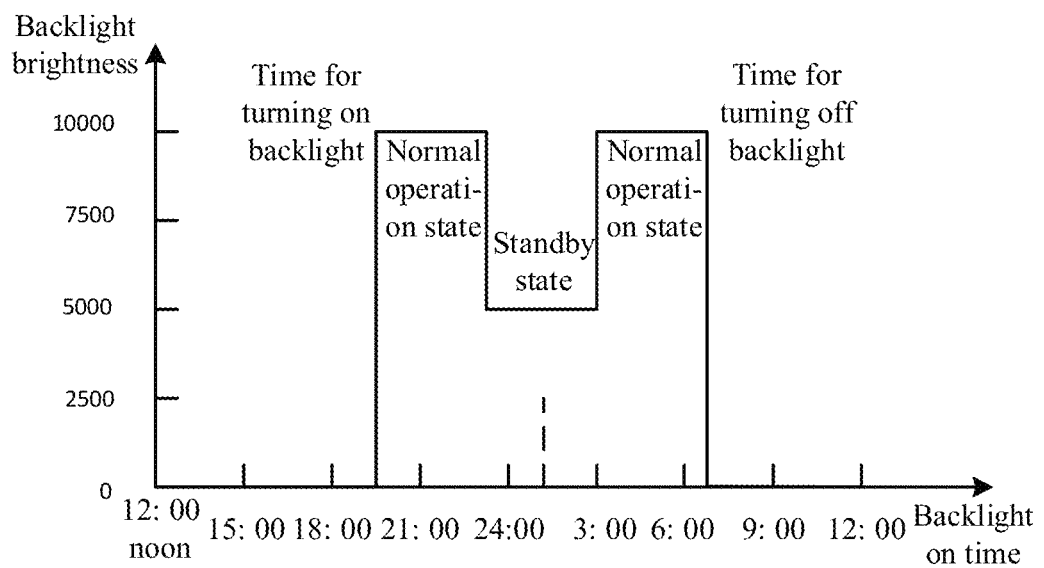
FIG. 18 is a schematic view of a specific signal timing correspondence and waveform change for processing and adjusting the backlight by a backlight module in a display device according to received BL_ON signal and PWM signal which are sent by a microcontroller unit.

The backlight module 700 receives a BL_ON signal and a PWM signal sent by the microcontroller unit 20, and processes and adjusts the backlight. The diagram showing the specific signal timing correspondence and waveform variation is shown in FIG. 18.

TABLE 5

| | Item | 19 inches black and white liquid crystal display apparatus | 19 inches color liquid crystal display apparatus | 46 inches color liquid crystal display apparatus | 43 inches color liquid crystal display apparatus |
|---|---|---|---|---|---|
| | Resolution | 1280*1024 | 1280*1024 | 1920*1080 | 1920*1080 |
| | PPI | 86 | 86 | 48 | 51 |
| | Display Mode | ADS | ADS | ADS | Negative ADS |
| Color film substrate | Opening ratio | 58% | 58% | 72% | 72% |
| | Model | | 14R/08G/16B | 14R/08G/08B | DNP-35R-B DNP-35G-B DNP-33B |
| | Thicknesses (um) | | 2.3 | 1 | 2.35 |
| Liquid crystal panel | Rubbing (Upper substrate/Lower substrate) | 90 degrees/0 degree | 90 degrees/0 degree | 90 degrees/0 degree | 90 degrees/0 degree |
| | Twist angle | 90 degrees | 90 degrees | 90 degrees | 90 degrees |
| | Liquid crystal cell thicknesses (um) | 3.2 | 3.2 | 3.55 | 3.55 |
| | Δn | 0.11 | 0.11 | 0.0937 | 0.0984 |
| External optical film | First polarizer (Transmission axis) | 90 degrees or 0 degree | 90 degrees or 0 degree | 90 degrees or 0 degree | 90 degrees or 0 degree |
| | Reflective polarizer (transmission axis) | 0 degree or 90 degrees | 0 degree or 90 degrees | 0 degree or 90 degrees | 0 degree or 90 degrees |
| | Second polarizer (transmission axis) | 0 degree or 90 degrees | 0 degree or 90 degrees | 0 degree or 90 degrees | 0 degree or 90 degrees |

Table 5 shows specific design parameters for the display apparatus provided by the embodiments of the present disclosure when applied to the 19 inches ADS liquid crystal white and black display apparatus, the 19 inches ADS liquid crystal color display apparatus, the 46 inches ADS liquid crystal color display apparatus, and the 43 inches ADS liquid crystal color display apparatus.

TABLE 6

| | Item | 19 inches black and white liquid crystal display screen | 19 inches color liquid crystal display screen | 46 inches color liquid crystal display screen | 43 inches color liquid crystal display screen |
|---|---|---|---|---|---|
| Transmissive mode | Transmittance | 14.20% | 4.40% | 9.20% | 6.30% |
| | contrast ratio | 100:1 | 120:1 | 120:1 | 160:1 |
| | color gamut | — | 67% | 36% | 74% |
| Reflective mode | Reflectivity | 38% | 5.50% | 8.20% | 4.60% |
| | contrast ratio | 5:01 | 6.2:1 | 13:01 | 15:01 |
| | color gamut | — | 29% | 35.40% | 34% |

Table 6 provides optical testing data for the display apparatus provided by the embodiments of the present disclosure when applied to the 19 inches ADS liquid crystal white and black display apparatus, the 19 inches ADS liquid crystal color display apparatus, the 46 inches ADS liquid crystal color display apparatus, and the 43 inches ADS liquid crystal color display apparatus in the transmissive and reflective display modes, respectively.

As can be seen from Tables 5 and 6, the display apparatus according to the embodiments of the present disclosure has excellent optical properties when applied to both the black and white display apparatus and the color display apparatus. In the transmissive state, the transmittance of the panel of the black and white display apparatus is 14.2%, and the contrast ratio thereof 100:1; in the reflective state, the reflectivity thereof is 38% and the viewing angle >70 degrees. In the transmission state, the transmittance of the panel of the color display apparatus is 9.2%, the contrast ratio thereof is 120:1 and the color gamut thereof is 36%; in the reflective state, the reflectivity thereof is 8.2% and the color gamut thereof is 35.4%. The display apparatus according to the embodiments of the present disclosure has an excellent optical performance and an intelligent switching function between the transmissive and reflective states, which can meet displaying requirements under different scenarios from the client.

The following points need to be explained.
(1) The drawings for the embodiments of the present disclosure only relate to structures involved in the embodiments of the present disclosure, and other structures may refer to general designs.
(2) In the drawings for describing the embodiments of the present disclosure, the thicknesses of layers or regions are enlarged or reduced for clarity, that is, the drawings are not drawn to scale. It should be understood that when an element such as a layer, a film, a region, or a substrate is referred to as being "on" or "below" another element, it can be "directly on" or "directly below" the other element or any intervening elements may be present.
(3) The embodiments of the present disclosure and features in the embodiments can be combined with each other to obtain anew embodiments in case of no conflict.

The foregoing is only specific implementations of the present disclosure, but the protection scope of the present disclosure is not limited thereto. The protection scope of the present disclosure is set forth in the claims.

What is claimed is:

1. A display apparatus, comprising a display screen, wherein the display screen comprises:
a transmissive liquid crystal panel, wherein the transmissive liquid crystal panel comprises a displaying side and a non-displaying side arranged opposite to each other;
a first polarizer, arranged at the displaying side of the transmissive liquid crystal panel;
a second polarizer, arranged at the non-displaying side of the transmissive liquid crystal panel, wherein a direction of a transmission axis of the first polarizer is perpendicular to a direction of a transmission axis of the second polarizer;
a scattering layer, arranged between the first polarizer and the transmissive liquid crystal panel, and/or arranged between the second polarizer and the transmissive liquid crystal panel; and
a reflective polarizer, the reflective polarizer being arranged between the transmissive liquid crystal panel and the second polarizer;
wherein the display apparatus further comprises:
a backlight module, configured for providing a light source to the display screen;
a video signal processing unit, configured for controlling a video display signal of the display screen;
a light detection unit, configured for collecting ambient light data;
a microcontroller unit connected to the light detection unit and the video signal processing unit, the microcontroller unit being configured for generating a mode switching signal according to the ambient light data collected by the light detection unit, and for controlling an operating state of the backlight module and an operating state of the video signal processing unit, to cause the display apparatus to be switched between a transmissive mode and a reflective mode,
wherein in the transmissive mode, the backlight module is turned on, and the video signal processing unit sends a first image display signal to the display screen; and
in the reflective mode, the backlight module is turned off, and the video signal processing unit sends a second image display signal to the display screen, an image grey scale of the first image display signal and an image grey scale of the second image display signal are complementary.

2. The display apparatus according to claim 1, wherein, the scattering layer comprises a scattering film.

3. The display apparatus according to claim 2, wherein, the reflective polarizer is located between the scattering film and the second polarizer in a case that the scattering film is arranged between the second polarizer and the transmissive liquid crystal panel.

4. The display apparatus according to claim 3, wherein, a direction of a diffusion axis of the scattering film, a direction of a transmission axis of the reflective polarizer and the direction of the transmission axis of the second polarizer are identical.

5. The display apparatus according to claim 4, wherein, the scattering film, the reflective polarizer and the second polarizer form an external composite film material, which is arranged on the transmissive liquid crystal panel in a full lamination manner.

6. The display apparatus according to claim 1, wherein, the scattering layer comprises a high-haze optical adhesive coating.

7. The display apparatus according to claim 1, wherein the first polarizer is arranged on the transmissive liquid crystal panel in a full lamination manner.

8. The display apparatus according to claim 1, wherein the display screen further comprises an antireflection thin film arranged on a side of the first polarizer away from the transmissive liquid crystal panel.

9. The display apparatus according to claim 1, wherein the transmissive liquid crystal panel is at least one of a twisted nematic liquid crystal panel, a vertically oriented liquid crystal panel, an in-plane switching liquid crystal panel, a fringe field switching liquid crystal panel, or a dye liquid crystal panel.

10. The display apparatus according to claim 1, wherein the reflective polarizer comprises a core layer formed by a plurality of birefringent material layers and a plurality of layers of non-birefringent materials that are alternately stacked, wherein a refractive index for the plurality of birefringent material layers is greater than a refractive index for the plurality of layers of non-birefringent materials.

11. The display apparatus according to claim 1, wherein, the light detection unit comprises a light collector, the light collector is arranged around the display screen for collecting the ambient light data; and the microcontroller unit comprises:

a data analyzer connected to the light collector, the data analyzer is configured for processing and analyzing light signal collected by the light collector to obtain an ambient light parameter L; and a signal generator, configured for sending, in a case that the ambient light parameter L is greater than a first critical value, a first signal to the backlight module and the video signal processing unit to cause the display apparatus to be switched to the reflective mode, and for sending, in a case that the ambient light parameter L is less than the first critical value or a signal indicating a damage to the light collector is received, a second signal to the backlight module and the video signal processing unit, to cause the display apparatus to be switched to the transmissive mode.

12. The display apparatus according to claim 11, wherein, the light collector comprises m host sensors and n secondary sensors, wherein m and n are both positive integers greater than or equal to 2, the m host sensors are arranged at a top position of the display screen at a use state, and the n secondary sensors are arranged at a bottom position of the display screen at the use state; and the data analyzer comprises:

a first determiner, configured for determining a quantity m' for host sensors among the m host sensors that collect light data, wherein m' is 0 or a positive integer less than or equal to m;

a first comparator connected to the first determiner, configured for determining, in a case that m' is a positive integer less than or equal to m, whether a difference value for the light data collected by m' host sensors is within a first predefined threshold by comparison;

a first data calculator connected to the first comparator, configured for calculating, in a case that the difference value for the light data collected by the m' host sensors is within first predefined threshold, an average value for the light data of the m' host sensors, to obtain first data $L_{M1}$, $L_{M1}=(M_1+M_2 \ldots M_{m'})/m'$, wherein $M_{m'}$ is light data of an (m')-th the host sensor;

a second determiner, configured for determining a quantity n' for secondary sensors among the n secondary sensors that collect the light data, wherein n' is 0 or a positive integer less than or equal to n;

a second comparator, the second comparator is connected to the second determiner, and the second comparator is configured for determining, in a case that n' is a positive integer less than or equal to n, whether a difference value for the light data collected by n' secondary sensors is within a second predefined threshold by comparison;

a second data calculator, configured for calculating, in a case that a different value for light data collected by x secondary sensors among the n' secondary sensors is within the second predefined threshold, and a different value for light data collected by remaining (n−x) secondary sensors exceeds the second predefined threshold, an average value for the light data of the x secondary sensors, to obtain second data $L_{S1}$, $L_{S1}=(S_1+S_2 \ldots S_x)/x$, wherein $S_x$ is light data of an x-th the secondary sensor, and x is a positive integer less than or equal to n;

a third data calculator connected to the first data calculator and the second data calculator, configured for obtaining, according to the first data $L_{M1}$ and the second data $L_{S1}$, the ambient light parameter L by $L=L_{M1}+|L_{S1}-L_{M1}|/(m'+x)$;

a third comparator connected to the first comparator and the second data calculator, configured for determining, in a case that the difference value for the light data collected by the m' host sensors exceeds the first predefined threshold, and the difference value for the light data collected by the n' secondary sensors is within the second predefined threshold, whether a difference value between the light data collected by each host sensor among the m' host sensors and the second data $L_{S1}$ is within a third predefined threshold by comparison;

a fourth data calculator connected to the third comparator, configured for calculating, in a case that a difference value between light data collected by y host sensors among the m' host sensors and the second data $L_{S1}$ is within the third predefined threshold, and a difference value for light data collected by remaining (m'−y) host sensors exceeds the third predefined threshold, an average value for the light data of the y host sensors to obtain fourth data $L_{M2}$, $L_{M2}=(M_1+M_2 \ldots M_y)/y$, wherein $M_y$ is light data of an y-th the host sensor, and y is a positive integer less than or equal to m';

a fifth data calculator connected to the fourth data calculator and the second data calculator, configured for obtaining, according to the fourth data $L_{M2}$ and the second data $L_{S1}$, the ambient light parameter L by $L=L_{M2}+|L_{S1}-L_{M2}|/(y+x)$;

a fourth comparator connected to the first comparator and the second comparator, configured for determining, in a case that the difference value for the light data collected by the n' secondary sensors exceeds the second predefined threshold and the difference value for the light data collected by the m' host sensors exceeds the first predefined threshold, whether a difference value between the light data collected by each of the m' host sensors and pre-stored light data, and a difference value between the light data collected by each of the n' secondary sensors and the pre-stored light data are within a fourth predefined threshold by comparison;

a sixth data calculator connected to the fourth comparator, configured for obtaining, according to light data of y' host sensors among the m' host sensors and and light data of x' secondary sensors among the n' secondary sensors, $L=LM3+|L_{s3}-L_{M3}|/(y'+x')$, a difference value between the light data of each of the y' host sensors and the pre-stored light data is within the fourth predefined threshold, a difference value between the light data of each of the x' secondary sensors and the pre-stored light data is within the fourth predefined threshold, wherein $L_{M3}=(M_1+M_2 \ldots M_{y'})/y'$, $M_{y'}$ is light data of a y'-th host sensor; $L_{s3}=(S_1+S_2 \ldots S_{x'})/x'$, wherein $S_{x'}$ is light data of an x'-th secondary sensor, and y' and x' are both positive integers less than or equal to n;

a seventh data calculator connected to the first determiner, the second determiner and the second data calculator, the seventh data calculator is configured for calculating, in a case that the m' is 0 and n' is a positive integer less than or equal to n, the ambient light parameter L by $L=L_{S1}$;

a third determiner connected to the first determiner and second determiner, configured for determining, in a case that the m' is 0 and n' is 0, that the damage to the light collector is present, and sending the signal indicating the damage to the light collector to the signal generator; and a fourth determiner connected to the fourth comparator, configured for determining, in a case that the difference value for the light date collected by the n' secondary sensors exceeds the second predefined threshold, and the difference value for the light data collected by the m' host sensors exceeds the first predefined threshold, and the difference value between the light data collected by each of the m' host sensors and the pre-stored light data, the difference value between the light data collected by each of the n' secondary sensors and the pre-stored light data exceeds the fourth predefined threshold, that the damage to the light collector is present, and sending the signal indicating the damage to the light collector to the signal generator.

13. The display apparatus according to claim 1, wherein, the video signal processing unit is further configured for:

outputting a video signal directly in a point-to-point mode to enable the display screen to perform a normal grayscale display, in case of receiving a first signal for switching the display apparatus to the transmissive mode; and performing an inverse color processing on the video signal and outputting a processed video signal to enable the display screen to perform a normal grayscale display, in case of receiving a second signal for switching the display apparatus to the reflective mode.

14. The display apparatus according to claim 1, wherein the video signal processing unit comprises:

a display drive unit connected to the display screen;

a T-con circuit connected to the microcontroller unit, configured for receiving the mode switching signal of the microcontroller unit;

a first gamma chip and a second gamma chip integrated on the T-con circuit, wherein the first gamma chip is configured for generating grayscale information in the transmissive mode, and the second gamma chip is configured for generating grayscale information in the reflective mode; and a multiplexer switch circuit connected between the T-con circuit and the display drive unit, configured for outputting corresponding grayscale information to the display drive unit according to the mode switching signal received.

15. The display apparatus according to claim 1, wherein, the microcontroller unit further comprises:

a first timer, configured for starting a timing when an ambient light parameter L collected by the light detection unit is greater than or equal to a first critical value; and a first judger, configured for determining whether the ambient light parameter L remains to be greater than or equal to the first critical value within a predetermined time period lased from a start of the timing, determining that the display apparatus needs to be switched to the reflective mode in case of a positive determination; and determining that the display apparatus does not need to be switched to reflective mode in case of a negative determination.

16. The display apparatus according to claim 1, wherein, the microcontroller unit further comprises:

a first signal generator, configured for generating, in a case that an ambient light parameter L is greater than a first critical value and is in a descending state, the mode switching signal when the ambient light parameter L is descended to the first critical value, controlling the display apparatus to be switched to the transmissive mode, and obtaining a backlight brightness value Lbl of the backlight module according to a liquid crystal panel surface brightness $Lts=Lbl*\beta$, wherein $\beta$ is a transmittance of the transmissive liquid crystal panel, and controlling the operating state of the backlight module according to the backlight brightness value Lbl;

a second signal generator, configured for controlling the backlight brightness value Lbl of the backlight module to remain unchanged in a case that the ambient light parameter L is less than the first critical value, and is in a descending state and greater than a second critical value;

a third signal generator, configured for starting a timing in a case that the ambient light parameter L reaches the second critical value, and determining whether the ambient light parameter L remains to be less than the second critical value within a predetermined time period lasted from a start of the timing, and controlling backlight brightness of the backlight module to decrease to Lbl/z in case of a positive determination, wherein z is a positive integer greater than 1;

a fourth signal generator, configure for starting a timing in a case that the ambient light parameter L increases from a value below the second critical value to a value above the second critical value, and determining whether the ambient light parameter L always remains to be greater than the second critical value within a predetermined duration period lasted from a start of the timing, and controlling the backlight brightness of the backlight module to increase to the backlight brightness value Lbl in case of a positive determination; and a fifth signal generator, configured for generating the mode switching signal when the ambient light parameter L increases to the first critical value, controlling the display apparatus to be switched to the transmissive mode and controlling the backlight module to be turned off.

* * * * *